US011049072B1

(12) United States Patent
Little et al.

(10) Patent No.: US 11,049,072 B1
(45) Date of Patent: Jun. 29, 2021

(54) ASYNCHRONOUS VIRTUAL COLLABORATION ENVIRONMENTS

(71) Applicant: STATE FARM MUTUAL AUTOMOBILE INSURANCE COMPANY, Bloomington, IL (US)

(72) Inventors: Rebecca A. Little, Gilbert, AZ (US); Bryan R. Nussbaum, Bloomington, IL (US); Deanna L. Stockweather, Normal, IL (US); Jacob Simonson, Tempe, AZ (US); An Ho, Phoenix, AZ (US); Vicki King, Bloomington, IL (US)

(73) Assignee: State Farm Mutual Automobile Insurance Company, Bloomington, IL (US)

(\*) Notice: Subject to any disclaimer, the term of this patent is extended or adjusted under 35 U.S.C. 154(b) by 0 days.

(21) Appl. No.: 16/395,932

(22) Filed: Apr. 26, 2019

(51) Int. Cl.
  *G06Q 10/10* (2012.01)
  *H04L 29/06* (2006.01)
  (Continued)

(52) U.S. Cl.
  CPC ............ *G06Q 10/10* (2013.01); *G06F 3/011* (2013.01); *G06F 3/04815* (2013.01);
  (Continued)

(58) Field of Classification Search
  CPC .... G06Q 30/065; G06Q 30/064; G06Q 10/10; G06F 3/0482; G06F 3/04812;
  (Continued)

(56) References Cited

U.S. PATENT DOCUMENTS 6,836,270 B2   12/2004   Du
7,027,054 B1\*  4/2006   Cheiky .................. G06T 13/40
                                                                345/473
(Continued)

FOREIGN PATENT DOCUMENTS

EP        0930755 A1    7/1999
WO   WO-2016/040376 A1  3/2016
WO   WO-2016/148753 A1  9/2016

OTHER PUBLICATIONS

Office Action for U.S. Appl. No. 16/163,099, dated Jan. 15, 2020, Little, "Method and System for Curating a Virtual Model for Feature Identification", 22 pages.
(Continued)

*Primary Examiner* — Steven P Sax
(74) *Attorney, Agent, or Firm* — Lee & Hayes, P.C.

(57) ABSTRACT

Systems and methods for facilitating virtual collaboration between users within virtual environments are disclosed. A plurality of users access a collaborative virtual environment system at various times using interface devices to establish an asynchronous virtual collaboration session in which users collaborate in real-time and/or asynchronously. To enable asynchronous collaboration, data from virtual collaboration session is stored and presented to later users, including user movements and interactions with the environment, user annotation, and audio communications or comments. Other users may then access the data at a later time, and later user interactions, annotations, and audio may likewise be stored for further review by other users.

20 Claims, 9 Drawing Sheets

(51) Int. Cl.
    *G06F 3/0481* (2013.01)
    *H04L 12/18* (2006.01)
    *G06F 3/01* (2006.01)
    *G02B 27/01* (2006.01)

(52) U.S. Cl.
    CPC ........ *H04L 12/1831* (2013.01); *H04L 65/403* (2013.01); *G02B 27/017* (2013.01)

(58) Field of Classification Search
    CPC .. G06F 3/0484; G06F 3/0488; G06F 3/04815; G06F 3/011; H04L 65/403; H04L 12/1831; G02B 27/017; G09G 5/14
    See application file for complete search history.

(56) References Cited

U.S. PATENT DOCUMENTS

| | | | |
|---|---|---|---|
| 8,718,612 | B2 | 5/2014 | Calman et al. |
| 8,761,811 | B2 | 6/2014 | Alonzo |
| 8,902,288 | B1 | 12/2014 | Fan et al. |
| 9,082,015 | B2 | 7/2015 | Christopulos et al. |
| 9,160,993 | B1* | 10/2015 | Lish ................. H04N 5/23229 |
| 9,875,509 | B1 | 1/2018 | Harvey et al. |
| 9,959,581 | B2 | 5/2018 | Pershing |
| 10,157,502 | B2* | 12/2018 | Montgomerie ....... G06F 40/169 |
| 10,163,271 | B1* | 12/2018 | Powers .............. G06Q 30/0631 |
| 10,242,501 | B1 | 3/2019 | Pusch et al. |
| 10,373,387 | B1* | 8/2019 | Fields ................... G06Q 40/08 |
| 10,721,280 | B1 | 7/2020 | Heppner et al. |
| 2002/0196202 | A1 | 12/2002 | Bastian et al. |
| 2009/0222742 | A1 | 9/2009 | Pelton et al. |
| 2012/0156668 | A1* | 6/2012 | Zelin ....................... G09B 5/12 434/362 |
| 2012/0231814 | A1 | 9/2012 | Calman et al. |
| 2013/0215116 | A1* | 8/2013 | Siddique .............. G06Q 20/204 345/420 |
| 2014/0267410 | A1* | 9/2014 | Fein ........................ G06T 11/00 345/633 |
| 2014/0279572 | A1 | 9/2014 | Coats et al. |
| 2014/0279573 | A1 | 9/2014 | Coats et al. |
| 2014/0280269 | A1 | 9/2014 | Schultz et al. |
| 2014/0280644 | A1 | 9/2014 | Cronin |
| 2014/0370958 | A1* | 12/2014 | Lutnick .................. G07F 17/32 463/17 |
| 2015/0020003 | A1 | 1/2015 | Karam |
| 2015/0206218 | A1 | 7/2015 | Banerjee et al. |
| 2016/0035140 | A1 | 2/2016 | Bickerstaff et al. |
| 2016/0048934 | A1 | 2/2016 | Gross |
| 2016/0092959 | A1 | 3/2016 | Gross |
| 2016/0148285 | A1 | 5/2016 | Kalata |
| 2016/0267610 | A1 | 9/2016 | Corbett et al. |
| 2016/0313736 | A1 | 10/2016 | Schultz et al. |
| 2016/0314545 | A1 | 10/2016 | Jessen |
| 2017/0032466 | A1 | 2/2017 | Feldman et al. |
| 2017/0032574 | A1* | 2/2017 | Sugaya .................. H04L 67/12 |
| 2017/0053455 | A1 | 2/2017 | Chen et al. |
| 2017/0076408 | A1 | 3/2017 | D'Souza et al. |
| 2017/0108922 | A1 | 4/2017 | Terahata |
| 2017/0124396 | A1 | 5/2017 | Todeschini et al. |
| 2017/0173466 | A1* | 6/2017 | Fahmie .................. A63F 13/30 |
| 2017/0329329 | A1* | 11/2017 | Kamhi .............. G06K 9/00604 |
| 2018/0089763 | A1 | 3/2018 | Okazaki |
| 2018/0158156 | A1 | 6/2018 | Dintenfass |
| 2018/0322702 | A1 | 11/2018 | Djajadiningrat |
| 2018/0350144 | A1* | 12/2018 | Rathod .............. G06Q 20/3276 |
| 2018/0374276 | A1* | 12/2018 | Powers .................. G06T 19/20 |
| 2019/0004639 | A1* | 1/2019 | Faulkner .............. H04L 65/403 |
| 2019/0098255 | A1* | 3/2019 | Bergmann ......... G06Q 10/1093 |
| 2019/0108578 | A1* | 4/2019 | Spivack .................... G09G 5/14 |
| 2019/0130656 | A1* | 5/2019 | Gebbie .................. G06T 19/20 |
| 2019/0180506 | A1* | 6/2019 | Gebbie .................. G06T 19/20 |
| 2020/0005538 | A1 | 1/2020 | Neeter |

OTHER PUBLICATIONS

Office Action for U.S. Appl. No. 16/242,206, dated Jan. 27, 2020, Little, "Virtual Environment Generation for Collaborative Building Assessment", 9 pages.

Office action for U.S. Appl. No. 16/163,146, dated Dec. 19, 2019, Little, "Method and System for Identifying Conditions of Features Represented in a Virtual Model", 24 pages.

Office Action for U.S. Appl. No. 16/163,200, dated Dec. 30, 2019, Little, "Predictive Analytics for Assessing Property Using External Data", 21 pages.

Office Action for U.S. Appl. No. 16/242,206, dated Jul. 18, 2019, Little, "Virtual Environment Generation for Collaborative Building Assessment", 9 pages.

Final Office Action for U.S. Appl. No. 16/163,099, dated Apr. 29, 2020, Little, "Method and System for Curating a Virtual Model for Feature Identification", 27 pgs.

Office Action for U.S. Appl. No. 16/242,206, dated May 19, 2020, Little, "Virtual Environment Generation for Collaborative Building Assessment", 9 pgs.

Final Office Action for U.S. Appl. No. 16/163,200, dated Jul. 10, 2020, Little, "Predictive Analytics for Assessing Property Using External Data", 26 pgs.

Final Office Action for U.S. Appl. No. 16/163,146, dated Jul. 2, 2020, Little, "Method and System for Identifying Conditions of Features Represented in a Virtual Model", 32 pgs.

Office Action for U.S. Appl. No. 16/397,407, dated Oct. 5, 2020, Little, "Asymmetric Collaborative Virtual Environments", 12 pages.

Office Action for U.S. Appl. No. 16/163,099, dated Sep. 28, 2020, Little, "Method and System for Curating a Virtual Model for Feature Identification", 31 pages.

* cited by examiner

ASYNCHRONOUS VIRTUAL COLLABORATION ENVIRONMENTS

TECHNICAL FIELD

The present disclosure generally relates to a system and a method for generating collaborative virtual environments enabling effective virtual collaboration sessions with multiple users.

BACKGROUND

Virtual reality (VR) systems have been developed that allow users to view and interact with components of virtual environments. These virtual environments may be either created as fictional environments or digitized representations of physical environments. For example, existing processes may be used to generate virtual environments representing the interior of a famous building or a local area of significance for virtual sight-seeing and tours, such as virtual environments representing the United States Capitol building and grounds. Additionally, multiple-user VR systems exist, but the collaboration capabilities of such systems are inadequate for many purposes, such as collaboration and training relating to assessment of physical sites.

Asynchronous collaboration creates particular challenges for VR systems. While solutions for asynchronous collaboration outside of virtual environments by sharing electronic documents (e.g., text documents or spreadsheets) are known, asynchronous collaboration in virtual environments would provide more effective collaboration. However, neither current VR systems nor current electronic collaboration systems provide asynchronous collaboration capabilities.

Various projects across an array of industries require collaborative interaction between individuals on a physical site, such that some of the individuals may need to travel to the physical site. Travel continues to be necessary in many situations because telephony and fixed-point digital image analysis (e.g., video conferences) do not allow the individuals to move about the physical site to address particular issues or concerns as they arise. Additionally, wireless communication is often insufficient or unreliable at such sites. Travel is time-consuming, inconvenient, and costly. In some situations, experts may be nearly constantly travelling to various sites to collaborate with local individuals. For example, expert trainers such as business underwriting specialists frequently travel to meet with local trainees such as insurance agents to provide training and expert analysis of local sites, such as commercial properties in a town. Considerable improvements in time and cost efficiency could be achieved if such individuals could collaborate remotely, but existing systems are ineffective in facilitating such collaboration.

SUMMARY

The present application discloses methods, systems, and computer-readable media storing instructions to facilitate asynchronous virtual collaboration between remote users. As described herein, the disclosed aspects improve existing VR systems by adding asynchronous collaborative capabilities to virtual environments, thereby enabling remote users to interact effectively with each other without requiring them to share a single virtual collaboration session. Various aspects are summarized below and described in further detail herein.

The present application discloses methods, systems, and computer-readable media storing instructions for recording virtual collaboration between a plurality of users during a virtual collaboration session. This may include establishing a first communication connection via a communication network with a first virtual environment interface device associated with a first user of the plurality of users; establishing a second communication connection via the communication network with a second virtual environment interface device associated with a second user of the plurality of users; establishing a communication channel between the first user and the second user via the first and second communication connections for facilitating bidirectional communication by routing real-time communication data between the first user and the second user during the virtual collaboration session; providing a virtual environment representing a physical location including a building to the first and second virtual environment interface devices for presentation to the first and second users; causing one or more data capture tools to be presented to at least the second user within the virtual environment; receiving a data capture command from the second user (which data capture command may be associated with a data capture tool of the one or more data capture tools); determining an environmental state of the virtual environment relative to the second user at the time of the data capture command based upon the data capture tool; generating a limited representation of the virtual environment based upon the data capture command and the environmental state; and/or storing the limited representation of the virtual environment for later review.

In some embodiments, the data capture tool may be a virtual camera tool. In such embodiments, the environmental state of the virtual environment may include a viewing perspective of the second user within the virtual environment, and the limited representation of the virtual environment may be a fixed-view two-dimensional image from the viewing perspective of the second user. The environmental state of the virtual environment may further include a viewing window centered on a gaze location of the second user, in which case the fixed-view two-dimensional image may capture the viewing window.

In further embodiments, the data capture tool may be a video recording tool. In such embodiments, the environmental state of the virtual environment may include a plurality of movements and viewing perspectives of the second user within the virtual environment, and the limited representation of the virtual environment may include a recording of the movements and the viewing perspectives of the second user over a time period during the virtual collaboration session. The movements of the second user may include repositioning within the virtual environment and hand movements of the second user within the virtual environment. Additionally, the recording may include an avatar representing the movements of the second user within the virtual environment.

In still further embodiments, the data capture tool may be a user annotation tool, which may be configured to capture a representation of a region of the virtual environment and a user annotation associated with the region of the virtual environment. In such embodiments, the environmental state of the virtual environment may include a position of the second user within the virtual environment, and the limited representation of the virtual environment may include the representation of the region of the virtual environment and the user annotation. The annotation may include a representation of a measurement of a physical distance at the physical location generated from a virtual distance between locations within the virtual environment.

In yet further embodiments, the methods, systems, and computer-readable media storing instructions for recording virtual collaboration between a plurality of users during a virtual collaboration session may further include: accessing a recording of the virtual collaboration session by a processor of a computing device via the communication network; and/or presenting the limited representation of the virtual environment to a third user by a display of the computing device. The recording of the virtual collaboration session may include a plurality of limited representations of the virtual environment, including the limited representation of the virtual environment. This may further include receiving a user note associated with a portion of the limited representation of the virtual environment from the third user, which may be stored as a record of the user note indicating the portion of the limited representation of the virtual environment. The record of the user note may be stored separately from the limited representation of the recording of the virtual collaboration session. In some embodiments, the user note may include an evaluation of actions of the second user during the virtual collaboration session relating to assessment of the building based at least in part upon the data capture command from the second user.

Systems or computer-readable media storing instructions for implementing all or part of the systems and methods described above may also be provided in some aspects. Systems for implementing such methods may include one or more mobile computing devices and/or one or more servers. Additional or alternative features described hereinafter may be included in some aspects.

BRIEF DESCRIPTION OF THE DRAWINGS

The figures described below depict various aspects of the applications, methods, and systems disclosed herein. It should be understood that each figure depicts an embodiment of one or more particular aspects of the disclosed applications, systems and methods, and that each of the figures is intended to accord with one or more possible embodiments thereof. Furthermore, wherever possible, the following description refers to the reference numerals included in the following figures, in which features depicted in multiple figures are designated with consistent reference numerals.

DETAILED DESCRIPTION

Figure 1:
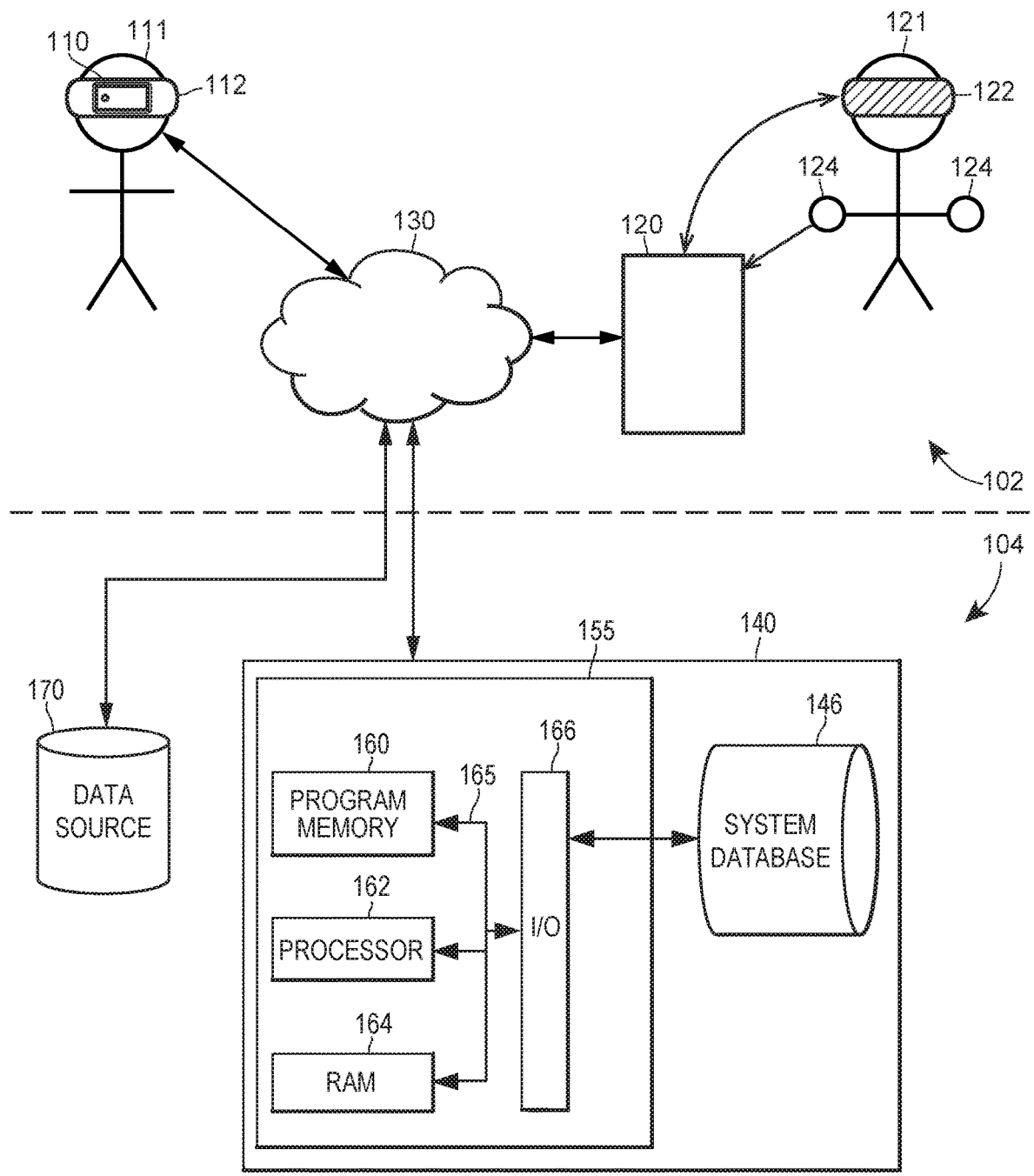
FIG. 1 illustrates a block diagram of an exemplary collaborative virtual environment system on which the methods described herein may operate in accordance with the described embodiments.

The systems and methods described herein improve existing VR systems by enabling remote asynchronous collaboration of users within virtual collaboration environments. In contrast to existing individual virtual environments, the virtual collaboration environments disclosed herein combine real-time communication channels with synchronized presentation of user interactions within the virtual environment. The combination of these elements enables effective virtual collaboration between users by facilitating asynchronous communication while viewing relevant physical locations in the virtual environment. Users can highlight, mark, annotate, or otherwise point out portions of virtual representations of physical environments for discussion and analysis. Such systems and methods solve the problem of enabling effective asynchronous collaboration of remote users in a virtual environment representing a physical site by establishing a virtual collaboration session that records communications and user interactions in the virtual environment for later playback and further recording by the same or other users.

For example, an expert trainer (e.g., a business underwriting specialist) may collaborate with trainees (e.g., local insurance agents) within a virtual collaboration environment to review a physical building or property near the trainee in some instances. However, real-time collaboration with all relevant users may not always be feasible due to scheduling or connectivity limitations. Thus, asynchronous virtual collaboration environments disclosed herein enable some or all of the users to collaborate in an asynchronous manner by recording user actions within the virtual environment for later review and further action. A virtual environment may be generated from images of a corresponding physical location to represent the building or property. Once a virtual collaboration session has been initiated within the virtual environment, the trainer (and, in some embodiments, some trainee users) may augment the virtual environment with annotations or other additions to the virtual environment. For example, the trainer may add a marker to call attention to a portion of the building, such as a security camera or a type of roofing, which will be stored and made visible to current and later users within the virtual environment. Simultaneous users may also discuss the associated portion of the building via a communication channel, and recorded audio of such discussions or of user comments may be stored for later users. Additionally, the trainer may configure the viewing perspectives of other current or later users within the virtual environment (i.e., user position and viewing direction) to facilitate better understanding and collaboration. Part or all of the virtual collaboration session may thus be stored for future review by trainees not connected during the virtual collaboration session. Various embodiments including additional or alternative features are discussed below.

System Overview

FIG. 1 illustrates a block diagram of an exemplary collaborative virtual environment system 100. The high-level architecture includes both hardware and software applications, as well as various data communications channels for communicating data between the various hardware and software components. The collaborative virtual environment system 100 may be roughly divided into front-end components 102 and back-end components 104. The front-end components 102 allow users to interact with a virtual environment via virtual environment interface devices, such as a mobile computing device 110 or a virtual reality system 120. The front-end components 102 may communicate with the back-end components 104 via a network 130. The back-end components 104 may include one or more servers 140 that may communicate with the front-end components 102 and/or data sources 170. The one or more servers 140 may be configured to implement virtual collaboration sessions between multiple users, as discussed further herein.

The front-end components 102 may include one or more mobile computing devices 110 associated with one or more mobile device users 111. Such mobile computing device 110 may include a tablet computer, smart phone, wearable computer, computer headset, or similar devices. While offering certain advantages in simplicity, such mobile computing devices 110 often lack the processing and display capabilities of more advanced systems, such as virtual reality systems 120 associated with VR system users 121. Thus, such mobile computing devices 110 may be considered low-capability virtual environment interface devices relative to virtual reality systems 120, which may be considered high-capability virtual environment interface devices. Although only one mobile computing device 110 of one mobile device user 111 and one virtual reality system 120 of one VR system user 121 are illustrated, it will be understood that a plurality of such devices may be included in various embodiments to enable any number of users to interact with the system.

The mobile computing device 110 may be a general-purpose smartphone or tablet computer with one or more position sensors (e.g., accelerometers, gyroscopes, or inertial measurement units) and a display screen. The positions sensors may provide data regarding position and movement of the mobile computing device 110 to facilitate determination of position or viewing perspective within the virtual environment. The display screen may be used to present a visual representation of a view of the virtual environment. The mobile device users 111 may interact with the mobile computing device 110 to access a virtual environment in a virtual collaboration session, as discussed herein. This may include mounting the mobile computing device 110 within a head mount 112 for hands-free use and a more immersive user experience, in some embodiments.

The virtual reality system 120 may be a general-purpose computer (e.g., a desktop computer or notebook computer) or may be a special-purpose computer specifically designed for virtual reality applications. The virtual reality system 120 may include or interface with one or more displays 122 to present a visual representation of a view of the virtual environment to the VR system user 121 and one or more input devices 124 to receive user input from the VR system user 121. In some embodiments, a display 122 and input devices 124 may be connected to the virtual reality system 120 as peripheral components.

In some embodiments, either or both of the mobile computing device 110 or the virtual reality system 120 may be a thin-client device, wherein much or all of the computing processes are performed by the server 140, with information communicated between the thin-client device and the server 140 via the network 130. Each of the mobile computing device 110 or the virtual reality system 120 may include any number of internal sensors and may be further communicatively connected to one or more external sensors by any known wired or wireless means (e.g., USB cables, Bluetooth communication, etc.). The mobile computing device 110 and virtual reality system 120 are further discussed below with respect to FIG. 2.

In some embodiments, the front-end components 102 may communicate with the back-end components 104 via the network 130. The network 130 may be a proprietary network, a secure public internet, a virtual private network or some other type of network, such as dedicated access lines, plain ordinary telephone lines, satellite links, cellular data networks, combinations of these, etc. Where the network 130 comprises the Internet, data communications may take place over the network 130 via an Internet communication protocol.

The back-end components 104 may include one or more servers 140 communicatively connected to the network 130. Each server 140 may include one or more processors 162 adapted and configured to execute various software applications and components of the collaborative virtual environment system 100, in addition to other software applications. The server 140 may further include a database 146, which may be adapted to store data related to the system 100, such as virtual environments, user annotations, data captures from virtual environments, recordings of virtual collaboration sessions, or similar data. The server 140 may access data stored in the database 146. The server 140 may have a controller 150 that is operatively connected to the database 146. It should be noted that, while not shown, additional databases may be linked to the controller 150 in a known manner. The controller 150 may include a program memory 160, a processor 162, a RAM 164, and an I/O circuit 166, all of which may be interconnected via an address/data bus 165. It should be appreciated that although only one microprocessor 162 is shown, the controller 150 may include multiple microprocessors 162. Similarly, the memory of the controller 150 may include multiple RAMs 164 and multiple program memories 160. Although the I/O circuit 166 is shown as a single block, it should be appreciated that the I/O circuit 166 may include a number of different types of I/O circuits. The RAM 164 and program memories 160 may be implemented as semiconductor memories, magnetically readable memories, or optically readable memories, for example.

The server 140 may further include a number of software applications or routines stored in a program memory 160. In some embodiments, these applications or routines may form modules when implemented by the processor 162, which modules may implement part or all of the methods described below to establish virtual collaboration sessions between users, record virtual collaboration sessions, or present recordings of such virtual collaboration sessions. In some embodiments, such modules may include one or more of a virtual environment generation module, a communication channel module, a collaboration session management module, a virtual environment presentation module, a data recordation module, or a review module.

The back-end components 104 may further include one or more data sources 170, communicatively connected to the network 130. The data sources 170 may include public or proprietary databases storing information that may be associated with a physical property represented in a virtual environment, such as ownership records, zoning data, tax assessments, environmental reports, business listings, or insurance policies.

Figure 2:
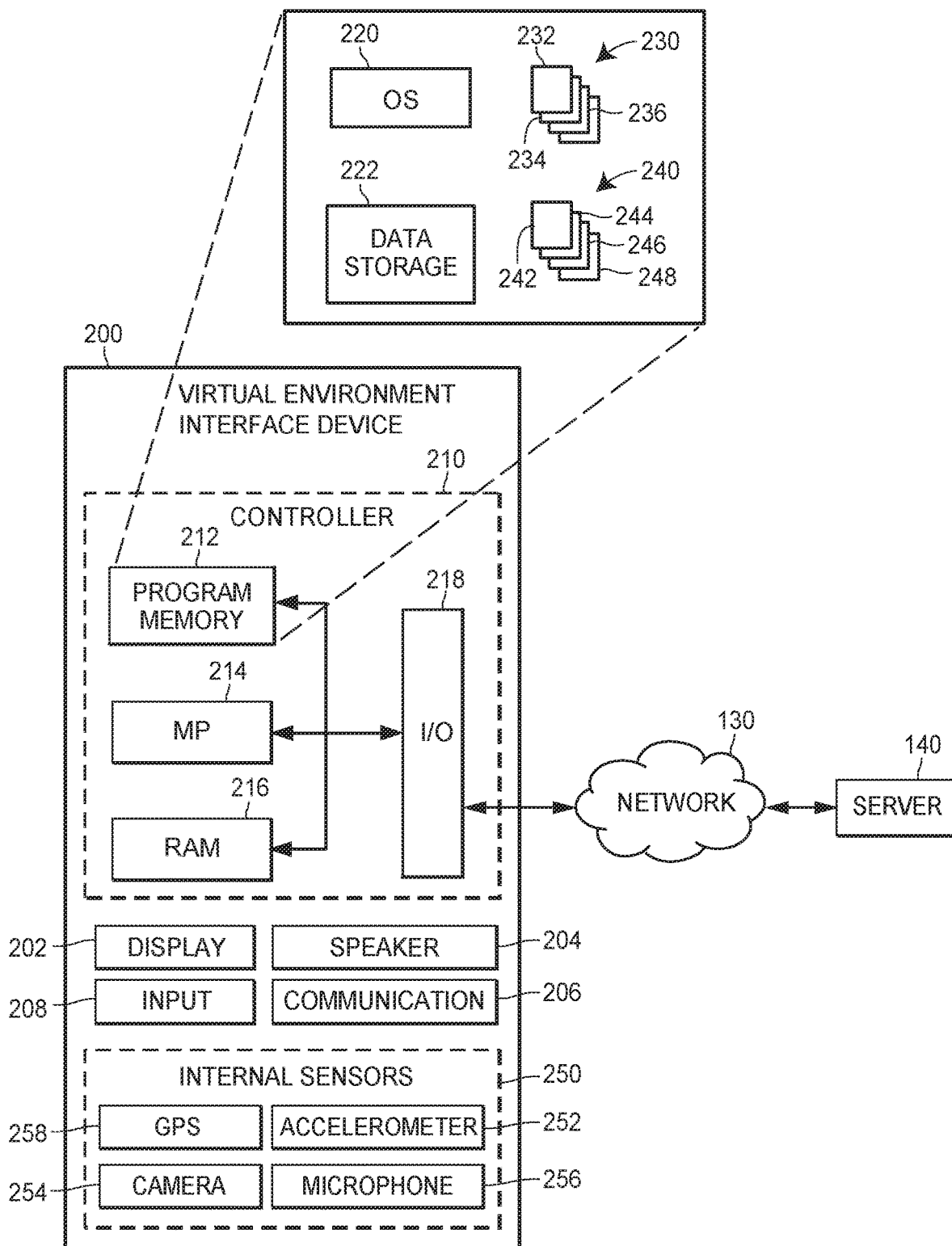
FIG. 2 illustrates a block diagram of an exemplary virtual environment interface device for user access to the collaborative virtual environments, in accordance with the embodiments described herein.

FIG. 2 illustrates a block diagram of an exemplary virtual environment interface device 200 for user access to the collaborative virtual environments, which virtual environment interface device 200 may be a mobile computing device 110 or a virtual reality system 120. The virtual environment interface device 200 may include one or more sensors 250, which may provide sensor data regarding a local physical environment in which the virtual environment interface device 200 is operating. Such sensor data may include accelerometer data to position the virtual environment interface device 200 within its local physical environment, which may be used for navigating within the virtual environment. The sensor data may be processed by the controller 210 to facilitate user interaction with the virtual environment, as discussed elsewhere herein. Additionally, or alternatively, the sensor data may be sent to one or more processors 162 of the server 140 through the network 130 for processing.

The virtual environment interface device 200 includes a display, which is used to present a visual representation of the virtual environment to the user. The visual representation of the virtual environment includes a plurality of views at positions within the virtual environment, which are presented to the user as the user navigates around the virtual environment. The virtual environment interface device 200 also includes a speaker 204, which may be used to present sounds associated with the virtual environment or communications from other users during a virtual collaboration session. The virtual environment interface device 200 likewise includes an input 208 to receive user input from the user, which may include user interactions with the virtual environment, in some embodiments. Each of the display 202, speaker 204, or input 208 may be integrated into the virtual environment interface device 200 or may be communicatively connected thereto.

The display 202 may include any known or hereafter developed visual or tactile display technology, including LCD, OLED, AMOLED, projection displays, refreshable braille displays, haptic displays, or other types of displays. The one or more speakers 204 may similarly include any controllable audible output device or component. In some embodiments, communicatively connected speakers 204 may be used (e.g., headphones, Bluetooth headsets, docking stations with additional speakers, etc.). The input 208 may further receive information from the user. Such input 208 may include a physical or virtual keyboard, a microphone, virtual or physical buttons or dials, or other means of receiving information. In some embodiments, the display 202 may include a touch screen or otherwise be configured to receive input from a user, in which case the display 202 and the input 208 may be combined.

The virtual environment interface device 200 may further include sensors 250. In some embodiments, additional external sensors may be communicatively connected to the mobile computing device, such as sensors of input devices 124 of a virtual reality system 120. The sensors 250 may include any devices or components mentioned herein, along with other extant devices suitable for capturing data regarding a physical environment of a virtual environment interface device 200 or presenting communication data or data regarding a virtual environment (e.g., representations of components of structures within the virtual environment or representations of user annotations or markings within the virtual environment). In some embodiments, the sensors 250 may further include additional sensors configured or intended for other uses, such as geolocation, photography, or spatial orientation of the device.

Although discussion of all possible sensors of the mobile computing device 110 would be impractical, if not impossible, several sensors warrant particular discussion. Disposed within the virtual environment interface device 200, the sensors 250 may include an accelerometer 252, a camera 254, a microphone 256, and a GPS unit 258. Any or all of these may be used to generate sensor data used in generating or interacting with virtual environments representing physical environments. Additionally, other types of currently available or later-developed sensors may be included in some embodiments.

The accelerometer 252 may include one or more accelerometers positioned to determine the force and direction of movements of the virtual environment interface device 200. In some embodiments, the accelerometer 252 may include a separate X-axis accelerometer, Y-axis accelerometer, and Z-axis accelerometer to measure the force and direction of movement in each dimension respectively. It will be appreciated by those of ordinary skill in the art that a three dimensional vector describing a movement of the virtual environment interface device 200 through three dimensional space can be established by combining the outputs of the X-axis, Y-axis, and Z-axis accelerometers using known methods.

Similarly, other components may provide additional positioning or movement sensor data. In some embodiments, a gyroscope may be used in addition to, or instead of, the accelerometer 252 to determine movement of the virtual environment interface device 200. For example, a MEMS gyroscope may be included within the virtual environment interface device 200 to detect movement of the virtual environment interface device 200 in three dimensional space. Of course, it should be understood that other types of gyroscopes or other types of movement-detecting sensors may be used in various embodiments. Such sensor data may be used to determine a relative position of the virtual environment interface device 200 within its local physical environment. In some instances, such relative position information may be combined with other sensor data (such as visual image data from a camera 254) to provide data from which a virtual environment can be generated. For example, multiple two-dimensional (2-D) images of the same object within the physical environment may be compared based upon relative position information to determine the size, distance, and three-dimensional (3-D) shape of the object based upon differences between the images. In other instances, such relative position information may be used to navigate an existing virtual environment by movements of the virtual environment interface device 200 within the local physical environment.

The camera 254 may be used to capture still or video images of the local physical environment of the virtual environment interface device 200 in the visual spectrum or other wavelengths, as well as objects or structures within the local physical environment. Such images may be used to generate virtual environments corresponding to physical environments in order to facilitate virtual collaboration sessions in such virtual environments. The one or more cameras 254 may include digital cameras or other similar devices, such as charge-coupled devices, to detect electromagnetic radiation in the visual range or other wavelengths. It will be readily understood that one or more cameras 254 may be disposed within the virtual environment interface device 200 and configured to generate either still images or video recordings. For example, multiple cameras 254 may be disposed within a mobile computing device 110 to obtain stereoscopic images of the physical environment, thereby better enabling the capture of images from which to generate a virtual environment. It will further be understood that many smartphones or tablet computers include front and back solid state digital cameras, which may be used to simultaneously obtain images of a large portion of the area before and behind the phone or tablet. Additional cameras 254 may also be communicatively connected to the virtual environment interface device 200. In some embodiments, the camera 254 may include an infrared illuminator or other device to stimulate emission within a targeted range. Such infrared illuminators may be automatically activated when light is insufficient for image capturing. Additional or alternative sensors 250 may be included in some embodiments to capture data regarding locations and shapes of objects within the physical environment.

The microphone 256 may be used to detect sounds within the local physical environment, such as spoken notes or comments by the user of the virtual environment interface device 200. The microphone 256 may likewise be used to capture spoken messages for communication between the users during a virtual collaboration session. One or more microphones 256 may be disposed within the virtual environment interface device 200 or may be communicatively connected thereto. For example, wired or wireless microphones 256 may be communicatively connected to the virtual environment interface device 200, such as wireless speaker/microphone combination devices communicatively paired with the virtual environment interface device 200.

The GPS unit 258 may provide information regarding the location or movement of the virtual environment interface device 200. The GPS unit 258 may use "Assisted GPS" (A-GPS), satellite GPS, or any other suitable global positioning protocol (e.g., the GLONASS system operated by the Russian government) or system that locates the position of the virtual environment interface device 200. For example, A-GPS utilizes terrestrial cell phone towers or Wi-Fi hotspots (e.g., wireless router points) to more accurately and more quickly determine location of the virtual environment interface device 200, while satellite GPS generally is more useful in more remote regions that lack cell towers or Wi-Fi hotspots.

The virtual environment interface device 200 may also communicate with the server 140, the data source 170, or other components via the network 130. For example, the virtual environment interface device 200 may communicate with another virtual environment interface device (not shown) during a virtual collaboration session by communication through the server 140 via the network 130. Such communication may involve the communication unit 206, which may manage communication between the controller 210 and external devices (e.g., network components of the network 130, etc.). The communication unit 206 may further transmit and receive wired or wireless communications with external devices, using any suitable wireless communication protocol network, such as a wireless telephony network (e.g., GSM, CDMA, LTE, etc.), a Wi-Fi network (802.11 standards), a WiMAX network, a Bluetooth network, etc. Additionally, or alternatively, the communication unit 206 may also be capable of communicating using a near field communication standard (e.g., ISO/IEC 18092, standards provided by the NFC Forum, etc.). Furthermore, the communication unit 206 may provide input signals to the controller 210 via the I/O circuit 218. The communication unit 206 may also transmit sensor data, device status information, control signals, or other output from the controller 210 to the server 140 or other devices via the network 130.

The virtual environment interface device 200 further includes a controller 210. The controller 210 receives, processes, produces, transmits, and stores data. The controller 210 may include a program memory 212, one or more microcontrollers or microprocessors (MP) 214, a random access memory (RAM) 216, and an I/O circuit 218. The components of the controller 210 may be interconnected via an address/data bus or other means. It should be appreciated that although FIG. 2 depicts only one microprocessor 214, the controller 210 may include multiple microprocessors 214 in some embodiments. Similarly, the memory of the controller 210 may include multiple RAMs 216 and multiple program memories 212. Although the FIG. 2 depicts the I/O circuit 218 as a single block, the I/O circuit 218 may include a number of different I/O circuits, which may be configured for specific I/O operations. The microprocessor 214 may include one or more processors of any known or hereafter developed type, including general-purpose processors or special-purpose processors. Similarly, the controller 210 may implement the RAM 216 and program memory 212 as semiconductor memories, magnetically readable memories, optically readable memories, or any other type of memory.

The program memory 212 may include an operating system 220, a data storage 222, a plurality of software applications 230, and a plurality of software routines 240. The operating system 220, for example, may include one of a plurality of mobile platforms such as the iOS®, Android™, Palm® webOS, Windows® Mobile/Phone, BlackBerry® OS, or Symbian® OS mobile technology platforms, developed by Apple Inc., Google Inc., Palm Inc. (now Hewlett-Packard Company), Microsoft Corporation, Research in Motion (RIM), and Nokia, respectively. The data storage 222 may include data such as user profiles and preferences, application data for the plurality of applications 230, routine data for the plurality of routines 240, and other data necessary to interact with the server 140 through the digital network 130. In some embodiments, the controller 210 may also include, or otherwise be communicatively connected to, other data storage mechanisms (e.g., one or more hard disk drives, optical storage drives, solid state storage devices, etc.) that reside within the mobile computing device 110. Moreover, in thin-client implementations, additional processing and data storage may be provided by the server 140 via the network 130.

The software applications 230 and routines 240 may include computer-readable instructions that cause the processor 214 to implement various functions of virtual collaboration sessions, as described herein. Thus, the software applications 230 may include a virtual reality application 232 to present a virtual environment to a user, a communication application 234 to send and receive real-time communication with one or more other users via a communication channel, and a network communication application 236 to receive and transmit data via the network 130. The software routines 240 may support the software applications 230 and may include routines such as a relative position tracking routine 242 to process sensor data to maintain a relative position of the virtual environment interface device 200 within a physical environment, a virtual position tracking routine 244 for determining a corresponding virtual position within the virtual environment, a user annotation routine 246 to generate user annotations within the virtual environment based upon user input, and a virtual object measurement routine 248 to determine physical dimensions or measurements based upon virtual measurements within the virtual environment. It should be understood that additional or alternative applications 230 or routines 240 may be included in the program memory 212, including web browsers or other applications.

In some embodiments, the virtual environment interface device 200 may include a wearable computing device or may be communicatively connected to a wearable computing device. In such embodiments, part or all of the functions and capabilities of the virtual environment interface device 200 may be performed by or disposed within the wearable computing device. Additionally, or alternatively, the wearable computing device may supplement or complement the virtual environment interface device 200. For example, the virtual environment interface device 200 may be connected to a smart watch or head-mounted display.

The collaborative virtual environment system 100 described above and illustrated in FIGS. 1-2 may be used to perform the methods discussed further below. Although the following description of exemplary methods discusses certain aspects of the invention disclosed herein as being performed by a mobile computing device 110 and a virtual reality system 120 communicating through the server 140 for clarity, it should be understood that some embodiments may include other arrangements of any number of any type of virtual environment interface device 200.

Virtual Environment Generation

Prior to initiating a virtual collaboration session between users, one or more virtual environments must be captured or generated. Such virtual environments may include representations of particular physical locations, such as building sites or parcels of real property. Although the following exemplary embodiments describe virtual environments including virtual representations of physical buildings in order to illustrate clearly certain aspects of the disclosed invention, other virtual environments are contemplated within the scope of the present disclosure. For example, other virtual environments may include representations of other physical structures (e.g., bridges, towers, rail yards, piers, dams, or wind turbines), representations of physical sites without structures (e.g., building sites), or computer-generated environments not based upon captured data from a physical site.

Figure 3:
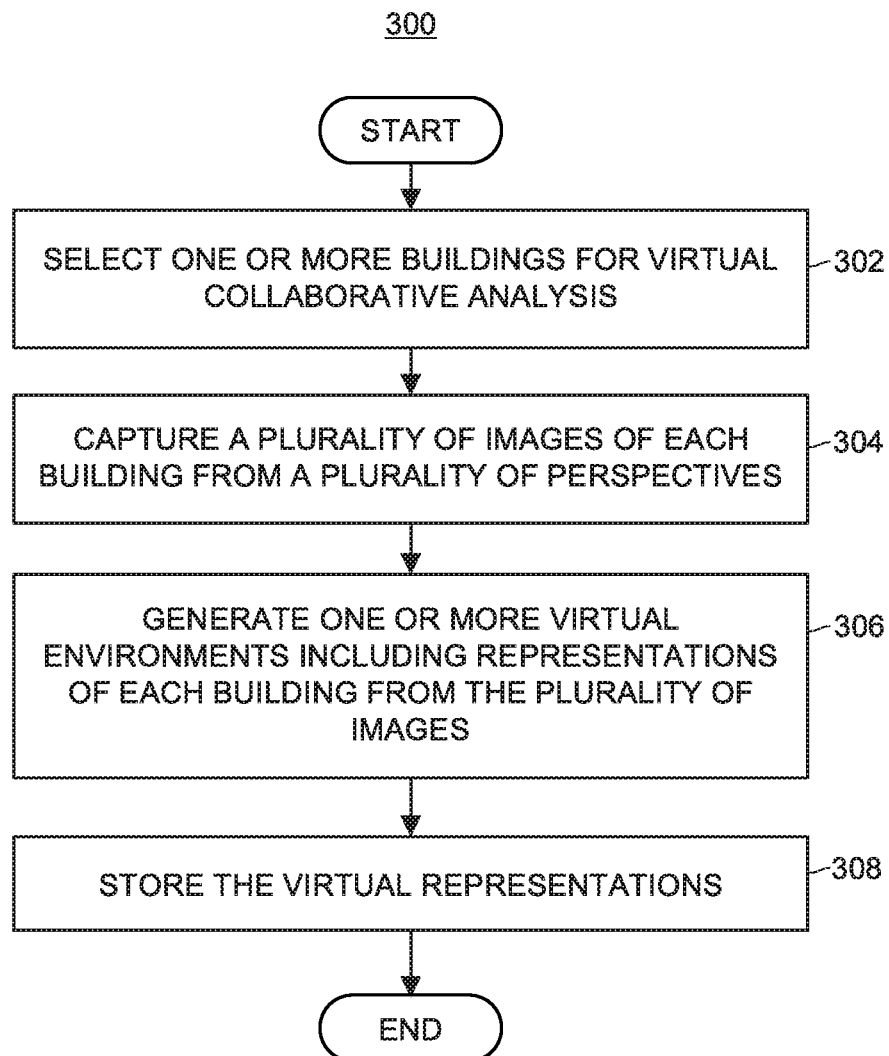
FIG. 3 illustrates an exemplary virtual environment generation method for generating a virtual representation of a physical environment including a building.

FIG. 3 illustrates an exemplary virtual environment generation method 300 for generating a virtual representation of a physical environment including a building based upon data captured at a physical site. The virtual environment generation method 300 may begin with selecting one or more buildings for collaborative analysis (block 302), after which a plurality of images of each selected building may be captured from a plurality of perspectives (block 304). The captured images may be processed to generate a virtual representation of each building (block 306), which may then be stored for further use (block 308). The virtual environment generation method 300 may be performed using one or more devices at one or more locations at one or more times, as discussed further below.

At block 302, a user of a computing device may select the one or more buildings for collaborative analysis. The computing device may be a mobile computing device 110, a virtual reality system 120, a server 140, or another computer (not shown). The selection of the one or more buildings may be received or transmitted to the server 140. Selecting a building may include selecting or entering identifying information regarding a building, such as an address. In some embodiments, selecting a building may include indicating the building for capture via a user interface of a virtual collaboration application or software system. For example, a user may select a building to capture by entering a street address into a virtual collaboration application, which may create a record or entry associated with the building in the virtual collaboration application.

At block 304, a plurality of images of each of the one or more buildings may be captured, such that the images show each building from a plurality of perspectives. Each of the plurality of images may, in some embodiments, be associated with absolute or relative location data to facilitate 3-D analysis of the set of the plurality of images. In some embodiments, capturing the plurality of images of a building may include scheduling photography of the building, such as by sending an electronic communication to an image capture specialists to photograph the building. In further embodiments, capturing the plurality of images of the building may include automatically dispatching an unmanned aerial vehicle to the physical location of the building to capture images of the building. In yet further embodiments, the user selecting the building may be instructed on procedures for capturing images of the building, such as by using the mobile computing device 110. In still further embodiments, the user may have previously captured the plurality of images of a building using the mobile computing device 110 or another device, in which case capturing the plurality of images may include uploading previously captured images to the server 140 for further analysis. For example, a trainee user may capture with a mobile computing device 110 and upload to the server 140 a plurality of digital images of a building prior to being trained by an expert trainer during a virtual collaboration session in a virtual environment including a representation of the building.

At block 306, the server 140 may process the captured images of each building to generate one or more virtual representations of the building as a virtual environment. The virtual environment may be generated from the plurality of images by generating one or more virtual 3-dimensional representations of the building using stereophotogrammetry or similar triangulation techniques. In some embodiments, a virtual environment may be generated to include a virtual model of the building. In further embodiments, the virtual representations may include a plurality of images (or portions thereof) to be presented from various perspectives within the virtual environment. In yet further embodiments, multiple quality or fidelity levels of the representations of the building may be generated by the server 140, such as a high-fidelity representation and a low-fidelity representation of the same perspective of the building. Such multiple quality levels may be advantageous in facilitating asymmetric virtual collaboration, as discussed below.

At block 308, the server 140 may store the generated virtual environment including the virtual representations of the building in an electronic memory for later use. The electronic memory may include the database 146, program memory 160, or another electronic storage device. In some embodiments, the stored data may be made accessible to a plurality of users of a virtual collaboration application or software system.

Figure 4:
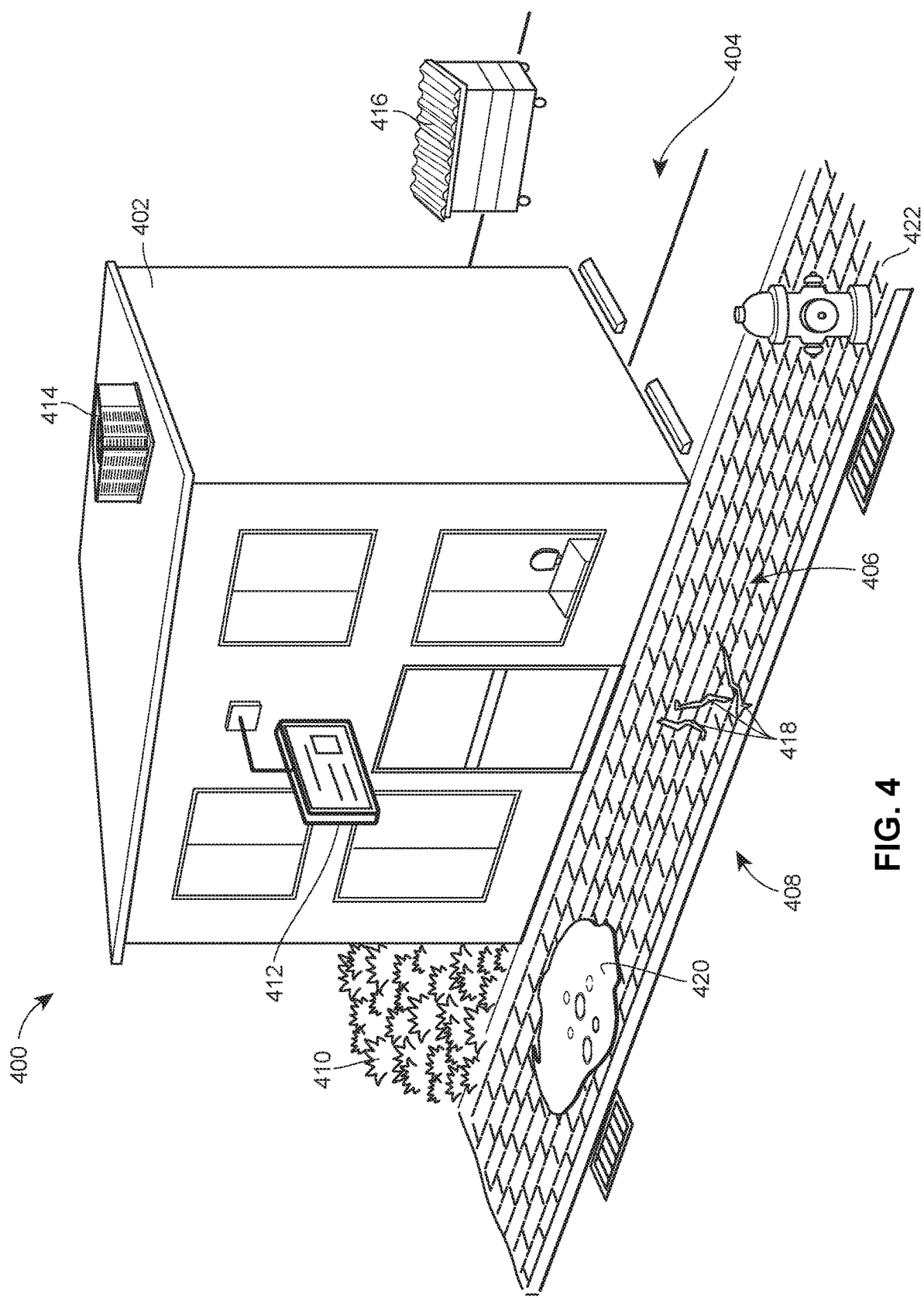
FIG. 4 illustrates an exemplary representation of the physical environment as a virtual environment presented to a user via a virtual environment interface device.

FIG. 4 illustrates an exemplary representation of a physical environment as a virtual environment 400 presented to a user via a display 202 of a virtual environment interface device 200. The virtual environment 400 includes a virtual representation of various features within the corresponding physical environment, including a building 402, an adjacent parking lot 404, a sidewalk 406, a street 408, and vegetation 410. Each of these virtual representations of features or objects within the physical environment at the physical location of the building may be separately identifiable in the virtual environment by the users of the virtual environment. In some embodiments, such features may be represented by separate virtual objects within the virtual environment. In other embodiments, the features may be distinguished by corresponding virtual locations within a virtual space of the virtual environment.

As illustrated, the exemplary virtual environment 400 may include representations of conditions or sub-features within the physical environment, such as a sign 412 or HVAC unit 414 of the building 402. Similar features may further include a dumpster 416 in or near the parking lot 404, as well as cracks 418, puddle 420, and fire hydrant 422 associated with the sidewalk 406. Such features, sub-features, and conditions are exemplary only, as each virtual environment will include representations of features and objects corresponding to those present at a physical location represented by the virtual environment.

Virtual Collaboration Sessions

In order to facilitate collaboration between multiple users in a virtual environment, such as that described above, a virtual collaboration application or software system may be used to establish virtual collaboration sessions. Such virtual collaboration sessions include a synchronized multi-user virtual environment and a communication channel between two or more users. In this manner, the users are enabled to collaborate remotely within a virtual environment in a manner similar to that in which they would be able to collaborate if meeting at a physical site. Thus, the virtual collaboration sessions described herein enable users to collaborate in an effective manner when located at different physical locations. Additionally, the users' physical locations may be distinct from the physical site corresponding to the virtual environment.

Figure 5:
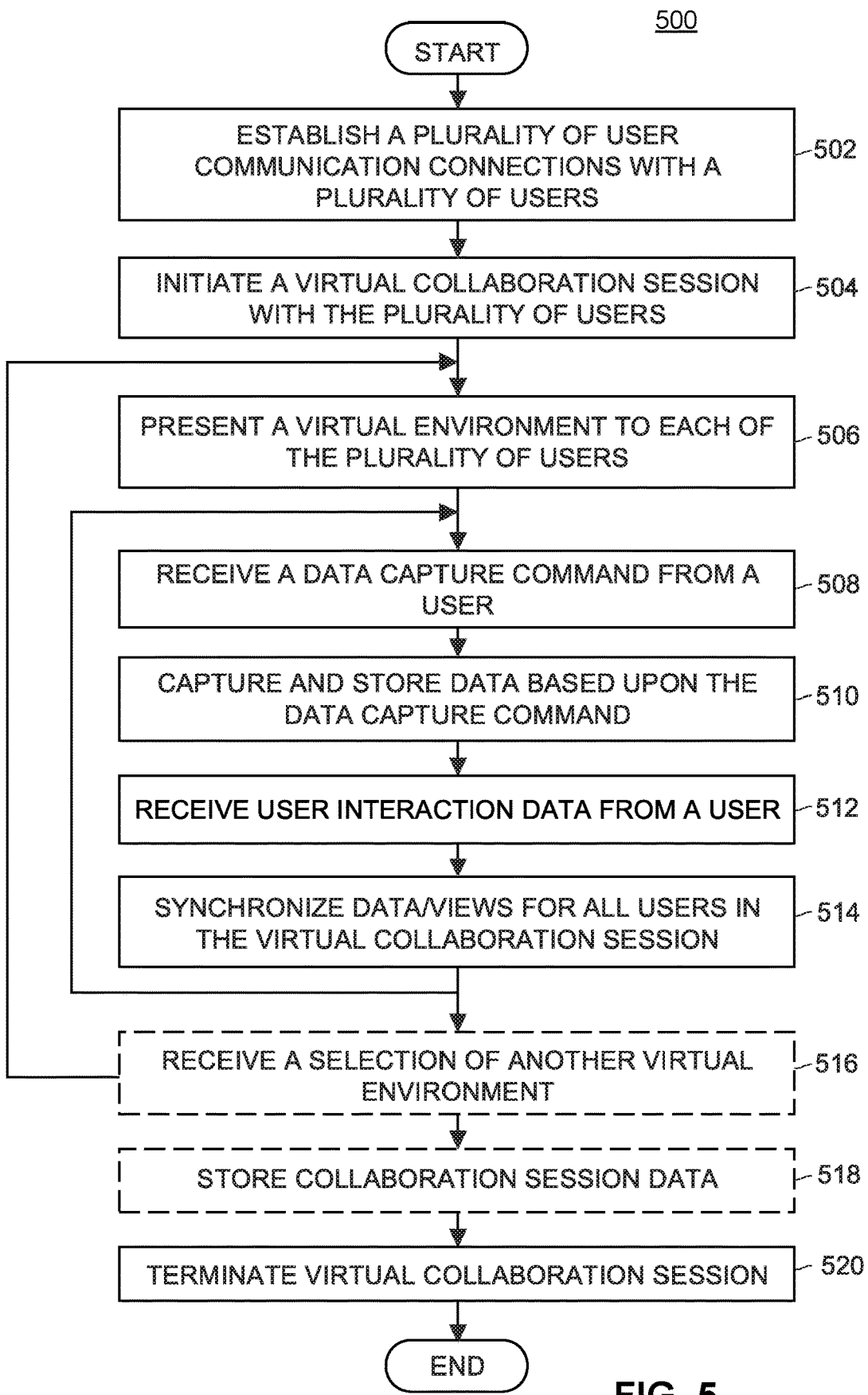
FIG. 5 illustrates an exemplary virtual collaboration method for establishing and facilitating virtual collaboration sessions between multiple users.

FIG. 5 illustrates an exemplary virtual collaboration method 500 for establishing and facilitating virtual collaboration sessions between multiple users. The method 500 may be implemented by a virtual collaboration application or software system executing on the server 140 of the collaborative virtual environment system 100. To implement the method 500, the server 140 may receive data from and provide data to a plurality of virtual environment interface devices 200 (e.g., mobile computing devices 110 and/or virtual reality systems 120) via the network 130. A two-user virtual collaboration session is described below for clarity, such that virtual collaboration occurs between an expert trainer using a virtual reality system 120 as a VR system user 121 and a trainee using a mobile computing device 110 as a mobile device user 111. Although two users are described below for simplicity, it should be understood that any number of users may collaborate in a virtual collaboration session, in which case data may be received from and presented to each user in the session. The virtual collaboration method 500 described below is exemplary, and additional or alternative features may be included in some embodiments.

The virtual collaboration method 500 may begin by establishing a plurality of user communication connections between a plurality of users and a virtual collaboration application (block 502) and initiate a virtual collaboration session (block 504). In the virtual collaboration session, a common virtual environment may be presented to each user (block 506). In some embodiments, a data capture command may be received from a user (block 508), in which case data regarding the virtual environment may be generated or captured for storage and later use (block 510), including annotations or other user-generated content within the virtual environment. User interaction data regarding user interaction with the virtual environment may be received from a user within the virtual environment (block 512), such as user comments or annotations. Based upon the user interaction data, the data or views of all users within the virtual collaboration session may be synchronized (block 514), such as by displaying an overlay to each user within the virtual environment. Such user interaction and synchronization may continue throughout the virtual collaboration session in the virtual environment. In some embodiments, a user may select another virtual environment for the virtual collaboration session (block 516), in which case another virtual environment may be presented to the users for further collaboration (blocks 506-514). When the collaboration session is complete, in some embodiments, collaboration session data may be stored for later use (block 518), then the collaboration session may terminate (block 520).

At block 502, the virtual collaboration application of the server 140 may establish a plurality of communication connections with a plurality of users. Establishing the communication connections may include connecting a plurality of virtual environment interface devices 200 to the server 140 via the network via the network 130 to enable bidirectional communication between the server 140 and each of the virtual environment interface devices 200. The plurality of virtual environment interface devices 200 may include a mobile computing device 110 associated with a mobile device user 111 (e.g., a trainee user) and a virtual reality system 120 associated with a VR system user 121 (e.g., an expert trainer user).

At block 504, the virtual collaboration application of the server 140 may initiate a collaborative session between the plurality of users. Initiating the virtual collaboration session may include establishing a communication channel for real-time bidirectional communication between the plurality of users, as well as providing a virtual environment to each of the plurality of users. In some embodiments, initiating the virtual collaboration session may further include providing at least one of the users with options relating to one or more data tools for interaction with the virtual environment.

Establishing a communication channel between the plurality of users may include establishing a voice communication channel between the plurality of virtual environment interface devices 200 via the server 140, such as a voice-over-Internet-protocol (VOIP) channel over the network 130 through the server 140 between the mobile computing device 110 of the trainee user and the virtual reality system 120 of the expert trainer user. Alternatively, establishing the communication channel may include providing data to each of the plurality of virtual environment interface devices 200 to enable such devices to connect and communicate through a separate communication connection, either through the network 130 or another communication network. In some embodiments, the communication channel may include text-based communication. Once established, the communication channel may continue routing data containing real-time communication messages between the plurality of users throughout the duration of the virtual collaboration session.

Providing the virtual environment to each of the plurality of users may include accessing a virtual environment previously generated and stored in a database 146, as discussed above. The virtual environment may include a virtual representation within a virtual space of a physical building, which may further include a virtual representation of the physical surroundings of such building. Upon accessing the virtual environment, the server 140 may send all or part of the virtual environment to each of the plurality of virtual environment interface devices 200 for presentation to the corresponding users. In some embodiments, the server 140 may provide the full virtual environment to each user, in which case the corresponding virtual environment interface device 200 may determine a portion of the virtual environment to present to the user. In other embodiments, the server 140 may provide portions of the virtual environment as requested by each virtual environment interface device 200 based upon current user locations or perspectives within the virtual environment during the virtual collaboration session. In some embodiments, virtual environment interfaces may also be provided to the virtual environment interface devices 200 for user navigation and interaction with the virtual environment.

Providing options relating to data tools may include providing one or more of the users with selectable options to use data tools to interact with the virtual environment. Such data tools may include annotation tools, comment tools, viewing tools, information tools, or data capture tools. Annotation tools may include tools that add marking or highlighting elements to the virtual environment to draw the attention of the users to particular features or objects within the virtual environment. For example, annotation tools may include drawing tools that enable a user to add pointers, circle areas, overlay highlighting, or otherwise add a visual indication to a location within the virtual environment. Comment tools may include tools that add user comments or notes to the virtual environment or to a location within the virtual environment, which may include text or voice comments. Viewing tools may include tools to adjust the viewing perspective of one or more users, such as by causing the view of one user to match the view of another user. Information tools may include tools to access and present information regarding the physical site corresponding to the virtual environment, such as official records, business records, environmental conditions, or other data relating to the physical site. Data capture tools may include tools for capturing and storing data during the virtual collaboration session for later use, such as virtual photographs of a perspective within the virtual environment, virtual video recordings, audio recordings, or other aspects of the virtual collaboration session. In some embodiments, all users may have access to data tools. In other embodiments, only certain users (e.g., an expert trainer) may have access to the data tools. In further embodiments, the data tools available to each user may vary between users. For example, all users may have access to data capture tools, while only expert trainers may have access to trainer-specific data tools. Such trainer-specific data tools may include a view synchronization tool to force a viewing perspective of one or more other users (e.g., trainees) to match the viewing perspective of the trainer within the virtual environment.

At block 506, the server 140 may cause the virtual environment to be presented to each of the users in the virtual collaboration session via displays 202 of the virtual environment interface devices 200. The virtual environment may be presented to the users as dynamic views of the virtual environment, through which the users may navigate. For example, the virtual environment may include a virtual representation of a building, around which the users may navigate to view different sides of the building from different perspectives. To enable users to navigate and interact with the virtual environment, presenting the virtual environment to a user may additionally include presenting a virtual environment interface configured to facilitate user movement within the virtual environment, use of data tools within the virtual environment, or other actions by the users within the virtual environment. Upon presentation of the virtual environment to the plurality of users within the virtual collaboration session, the users may communicate with each other while viewing or interacting with the virtual environment.

In some embodiments, one or more users may interact with the virtual environment to capture data relating to portions of the virtual environment for later use, such as by using data capture tools. As discussed below with respect to blocks 508 and 510, upon receiving a data capture command from one of the users during the virtual collaboration session, the virtual collaboration application of the server 140 may determine data to capture within the virtual environment, generate a limited representation of the captured data from the virtual environment, and store the limited representation. Generating a limited representation of the virtual environment or of data captured from the virtual environment may include determining and using an environmental state associated with the virtual environment relative to the user issuing the data capture command, such as a position or viewing perspective of the user within the virtual environment.

At block 508, in some embodiments, the virtual collaboration application of the server 140 may receive a data capture command from one of the plurality of users' virtual environment interface devices 200. Such data capture command may be issued by the user to capture data from the virtual collaboration session for later review by the user or by another user. The data capture command may be generated and sent to the server 140 by the virtual environment interface device 200 in response to use of a data capture tool by the user within the virtual environment. The data tools may include a virtual camera tool, a video recording tool, a user annotation tool, or any of the data capture tools discussed elsewhere herein. The data capture command may specify a type of data to capture (e.g., a still image, a video recording, or a text comment). In some embodiments, the data capture command may further specify a perspective from which the data should be captured or a limitation on the data to be captured. For example, the data capture command may specify data capture from the perspective of the user issuing the command or from another user (e.g., from the perspective of an expert trainer). Similarly, the data capture command may specify data capture of all data or only a portion of the data in the virtual environment, such as a limited set of data overlays (e.g., certain or all annotations, annotations and comments, or only comments).

At block 510, in some embodiments, the virtual collaboration application of the server 140 may generate and store a record of captured data, according to the data capture command. Generating the captured data may include generating a limited representation of the virtual environment based upon the received data capture command and an environmental state of the virtual environment relative to the user from whom the data capture command is received. The environmental state may be determined based upon the position of the user within the virtual environment, the viewing perspective or view direction of the user within the virtual environment, user view characteristics (e.g., view window or gaze location), or other state characteristics associated with the user or the virtual environment. The data capture command may further specify the type of data to be captured (e.g., a still image, a virtual video recording, an annotation, or a measurement), as well as aspects of data capture (e.g., field of capture, image resolution, duration of video capture, or type of virtual overlays to capture). Based upon the data capture command and the determined environmental state, the virtual collaboration application of the server 140 may generate and store the limited representation of the virtual environment for later use.

The record of the captured data may be generated based upon the information specified in the data capture command and stored in a database 146 or other data storage for further use during or following the virtual collaboration session. In some embodiments, the captured data may be processed to reduce storage requirements, such as by flattening the 3-D virtual space into a 2-D image or video, which may further facilitate transmission and review of the captured data. The following examples of data capture are provided to illustrate the operation of such data capture tools, but other types of data capture may likewise be implemented in further embodiments.

The data capture tools provided to the user may include a virtual camera tool for capturing a still image of a view within the virtual environment. Upon receiving a data capture command indicating the use of the virtual camera tool, the server 140 may determine the viewing perspective (i.e., the position and viewing direction of the user) of the user within the virtual environment as a relevant environmental state, then generate a limited representation of the virtual environment as a fixed-view two-dimensional image from the viewing perspective of the user. In some such instances, the server 140 may further determine one or more user view characteristics as additional environmental states, such as a viewing window centered on a gaze location of the user, in which case the fixed-view two-dimensional image may capture the viewing window.

The data capture tools provided to the user may similarly include a video recording tool for capturing a video recording of user interaction with the virtual environment during all or a portion of the virtual collaboration session. Upon receiving a data capture command indicating the use of the video recording tool, the server 140 may determine a plurality of movements and viewing perspectives of the user within the virtual environment over a period of time during the virtual collaboration session as relevant environmental states. The relevant environmental states may include repositioning of the user within the virtual environment and movements of the user's head, hands, or other user input for interacting with the virtual environment. The server 140 may then generate a limited representation of the virtual environment from the perspective of the user as a recording of the movements and the viewing perspectives of the user. In some such embodiments, the recording may include an avatar of the user representing the movements of the user within the virtual environment.

The data capture tools provided to the user may similarly include a user annotation tool for capturing user annotations relating to portions of virtual environments. The data capture command associated with such user annotation tool may include one or more user annotations or comments associated with a portion of the virtual environment specified by the user, such as a portion of a building or an anchor location within the virtual environment. Upon receiving a data capture command indicating the use of the user annotation tool, the server 140 may determine a position or viewing perspective of the user within the virtual environment as relevant environmental states. Based upon the user annotations and the environmental states, the server 140 may generate a representation of a region within the virtual environment from the viewing perspective of the user, together with one or more virtual overlays representing the user annotations, as the limited representation of the virtual environment. In some embodiments, the user annotations may include a representation of a measurement of a physical distance associated with a portion of a physical site corresponding to a virtual distance indicated by the user in the virtual environment. Such measurement may be captured using a virtual tape measure or similar tool to estimate the physical distance between two points based upon the distance between corresponding points in a virtual space within the virtual environment.

Once generated by the server 140, the limited representation of the virtual environment may be stored in the database 146 or another memory device for future use. In some embodiments, the captured data may be verified or reviewed by the user prior to being stored.

At block 512, the server 140 may receive user interaction data from one of the plurality of users' virtual environment interface devices 200. The user interaction data may include data relating to a user interaction with all or part of the virtual environment. Such interaction may include the use of any of the data tools discussed above, particularly the annotation tools, comment tools, view tools, or information tools. The user interaction data may indicate a location with the virtual environment, such as a portion of a virtual representation of a building, or may be general to the virtual environment, such as a data overlay.

Location-specific user interaction data may include an annotation or comment regarding an aspect of a portion of a building, such as a mark or note regarding a condition of the portion of the building. For example, the user may add a mark-up encircling a portion of a roof of a building showing damage or aging (e.g., worn or missing roofing tiles). As another example, a location-specific annotation may include a marker associated with a comment regarding the presence of a security camera on the exterior of the building. As yet another example of location-specific user interaction data, a user may select an option to focus the user's view on a location within the virtual environment, such as to obtain a higher-resolution view of a portion of a building. In some embodiments, the user interaction data may include a command to synchronize the viewing perspective within the virtual environment of the user issuing the command and another user within the virtual collaboration session. For example, an expert trainer may issue a command to cause the views of all other users to match the current view of the expert trainer. Alternatively, a trainee may issue a command to cause the trainee's view to match the current view of an expert trainer.

Location-independent user interaction data may include a data overlay relating to the physical location represented by the virtual environment as a whole, without particular reference to any portion of the virtual environment. For example, the data overlay may include public records regarding property ownership or zoning for the real property located at the physical site represented by the virtual environment. In some embodiments, the user interaction data may indicate location-independent data overlays that combine data from a plurality of sources, such as address data and both property owner data from public records and business data based upon the address data.

At block 514, the virtual collaboration application of the server 140 may synchronize the views or data presented to each of the plurality of users in the virtual collaboration session. By synchronizing the views or data presented to all the users, the virtual collaboration session enables each user to obtain real-time updates to the virtual environment, such as the addition of annotations or comments as they are made. Such synchronization may occur by adding virtual overlays associated with the user interaction data or by implementing viewing perspective adjustments for one or more users.

Virtual overlays may be generated by the virtual collaboration application of the server 140 based upon the received user interaction data. Each virtual overlay may include a visual representation of information to be displayed within the virtual environment. For example, a virtual overlay associated with an annotation may include a visual representation (e.g., a marker or drawing) of the annotation, while a virtual overlay associated with a comment may include an icon indicating the existence of a comment or a text window displaying the comment. Synchronizing the views or data presented to each of the plurality of users may be achieved by updating the virtual environment provided to each of the plurality of users to present the virtual overlay as part of the virtual environment displayed to the user by the display 202 of the user's virtual environment interface device 200. Multiple virtual overlays associated with various user interaction data from one or more users during the course of the virtual collaboration session may be generated and simultaneously displayed to each user to represent various information regarding features or aspects of the building or other location represented in the virtual environment.

Where the user interaction data is location-specific user interaction data associated with a location in the virtual environment, the virtual overlay may be correspondingly associated with the location in the virtual environment. For example, where the user interaction data indicates a portion of a building in the virtual environment, the corresponding virtual overlay may be associated with the portion of the building or a corresponding location within the virtual environment. Where the user interaction data is location-independent user interaction data associated with the virtual environment as a whole, the virtual overlay may be generated for the virtual environment as a whole. In some embodiments, such location-independent virtual overlays may be configured to present information to users at a default location within the virtual environment or in a location-independent manner (e.g., as a floating overlay that does not adjust according to the user's viewing perspective within the virtual environment). In further embodiments, the virtual overlay may be generated using additional data, which may be accessed from a data source 170. Accessing the additional data may include retrieving one or more of the following types of external data: property zoning data, property tax assessments, property environmental reports, property ownership records, or insurance policy records.

Viewing perspective adjustments may likewise be implemented to synchronize the views of the virtual environment presented to the users during the virtual collaboration session. Such viewing perspective adjustments may be implemented by identifying a user viewing perspective (i.e., location and viewing direction within the virtual environment) of one of the plurality of users, then setting the viewing perspective of another user to match the identified viewing perspective. In some embodiments, one or more following users' viewing perspectives may be locked to that of a leading user, such that the viewing perspectives of the following users' viewing perspective automatically update to match that of the leading user when the leading users changes location or viewing direction within the virtual environment. Such viewing perspective locking may be used for a portion of the virtual collaboration session in order to allow the leading user to direct the attention of the following users to certain features or aspects of interest within the virtual environment.

At block 516, in some embodiments, the server 140 may receive a selection of another virtual environment to view during the virtual collaboration session. Upon receiving such selection of another virtual environment from one or more of the virtual environment interface devices 200, the virtual collaboration application of server 140 may identify and present the selected additional virtual environment to the plurality of users via the users' virtual environment interface devices 200 (block 506). Review and interaction with the additional virtual environment may then proceed as discussed above with respect to blocks 506-514.

When no further virtual environments are selected for the virtual collaboration session, at block 518, in some embodiments, the server 140 may store the collaboration session data in a database 146 or other memory for later reference or use. Such collaboration session data may include captured data, user interaction data, or data overlays. In some embodiments, a recording of the complete virtual collaboration session may be stored for future review by the same or other users. The stored collaboration session data may be processed to reduce storage requirements prior to storage, such as by flattening the 3-D virtual space into a 2-D image or video, which may further facilitate transmission and review of the captured data.

At block 520, the server 140 may terminate the virtual collaboration session. Terminating the virtual collaboration session may include disconnecting the user communication connections and closing the communication channel between the users.

Figure 6:
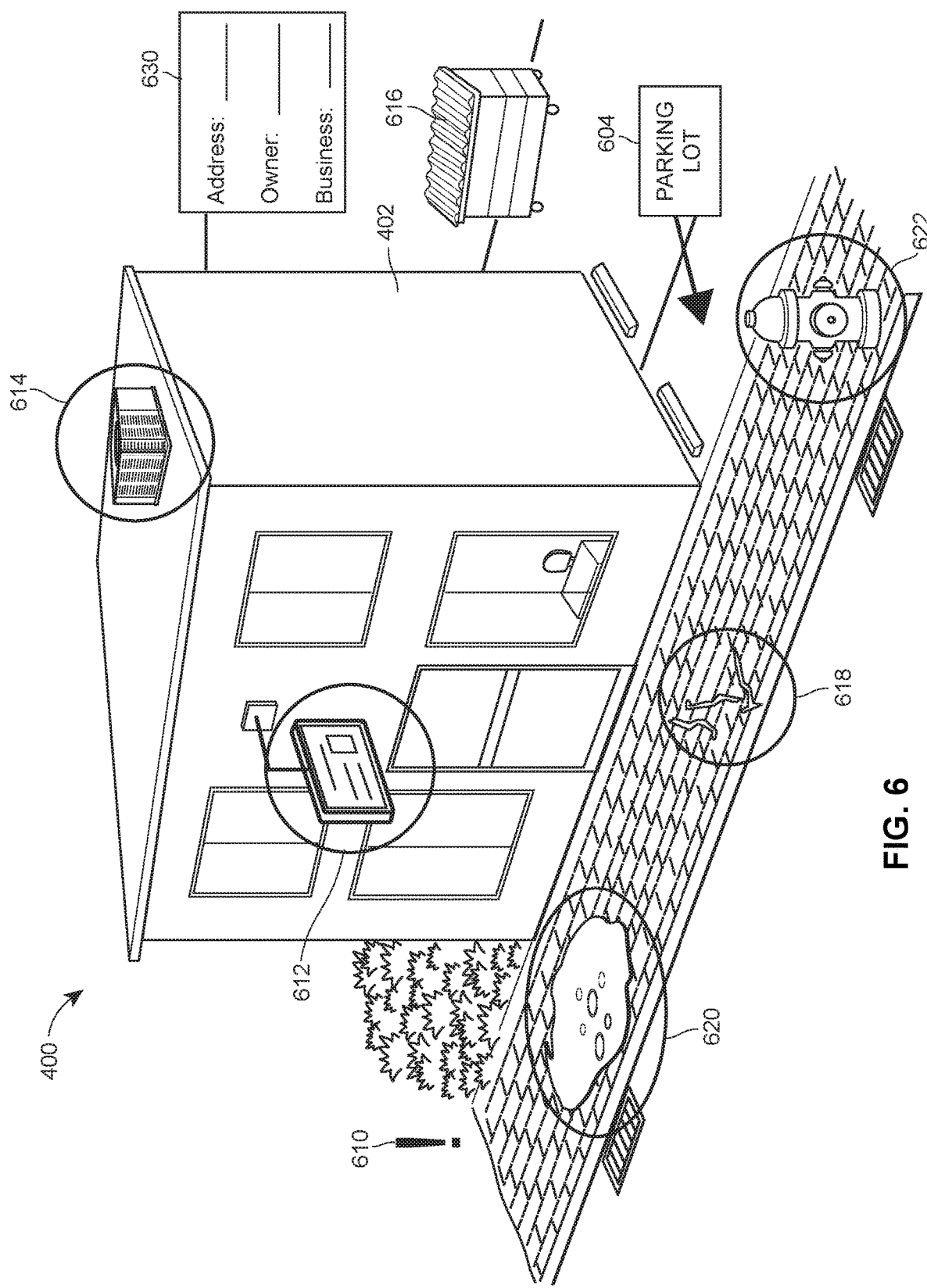
FIG. 6 illustrates an exemplary representation of the virtual environment, including virtual overlays.

FIG. 6 illustrates an exemplary representation of the virtual environment 400 illustrated in FIG. 4 above, including virtual overlays added during a virtual collaboration session. The virtual environment 400 shows the building 402 but also includes several virtual overlays, such as annotations and comments added by users during a collaborative evaluation of the building and its immediate surroundings. The virtual overlays include simple annotations indicating aspects of the virtual environment by circles drawn by a user around the corresponding aspects, including the following: annotation 612 indicating sign 412, annotation 614 indicating HVAC unit 414, annotation 618 indicating cracks 418, annotation 620 indicating puddle 420, and annotation 622 indicating fire hydrant 422. Additionally, the virtual overlays include comment indicators associated with comments by users entered during the virtual collaboration session, including a comment indicator 604 indicating and displaying a comment regarding the parking lot 404, as well as collapsed comment indicator 610 indicating the existence of a comment regarding the vegetation 410 (but not displaying the comment). Additionally, a location-independent virtual overlay 630 presenting external data regarding the address, owner, and business located at the physical site associated with the virtual environment.

Figure 7:
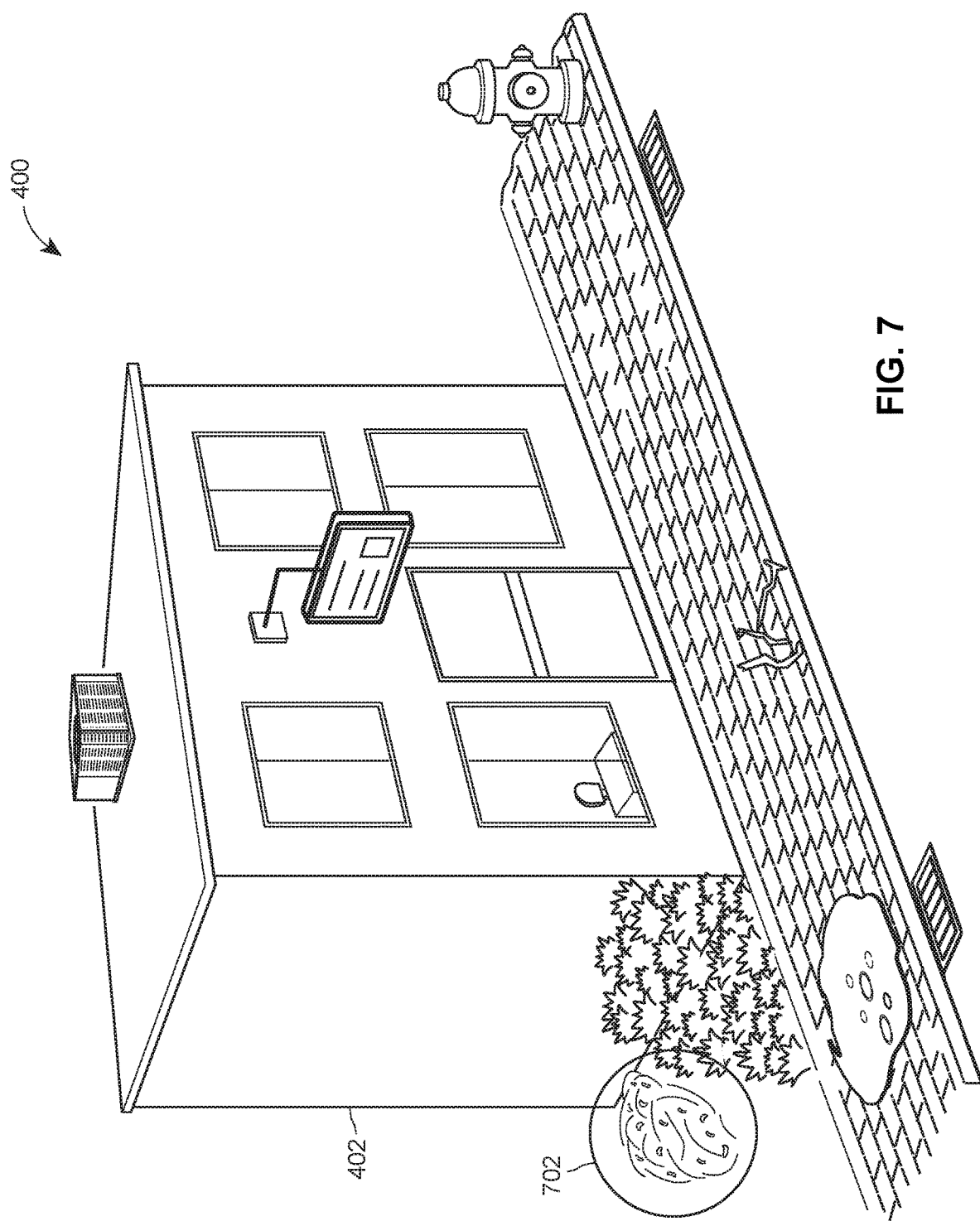
FIG. 7 illustrates an exemplary representation of another view of the virtual environment, including a user annotation.

FIG. 7 illustrates an exemplary representation of another view of the virtual environment 400, including an additional user annotation 702. As illustrated, the virtual environment 400 may be viewed from a plurality of viewing locations, allowing users to view different portions of the virtual environment. For example, FIG. 6 illustrates a front view of the building 402, while FIG. 7 illustrates a side view of the building 402. By viewing the building 402 from the side, pooling water indicated by annotation 702 can be observed by the users during the virtual collaboration session.

Asymmetric Virtual Collaboration Sessions

Under some conditions, it may be advantageous to provide lower quality versions of the virtual environment to some users of the collaborative virtual environment system 100 during a virtual collaboration session. Such virtual collaboration sessions in which virtual environments of multiple quality levels are provided to various users are referred to herein as asymmetric virtual collaboration sessions. For example, users within a virtual collaboration session may have access to different types of virtual environment interface devices 200. Frequent users of the collaborative virtual environment system 100 may invest in high-capability computing equipment, while infrequent users may utilize general-purposes low-capability computing equipment. For example, an expert trainer may be a VR system user 121 of a (high-capability) virtual reality system 120, while a trainee may be a mobile device server 111 of a (lower-capability) mobile computing device 110. Additionally, or alternatively, some users may have lower-quality connections via the network 130, thereby limiting the ability of such users to access high-quality data in a timely manner. Asymmetric virtual collaboration sessions may be implemented by the collaborative virtual environment system 100 to enable collaboration by users, despite such equipment or connection differences.

Figure 8:
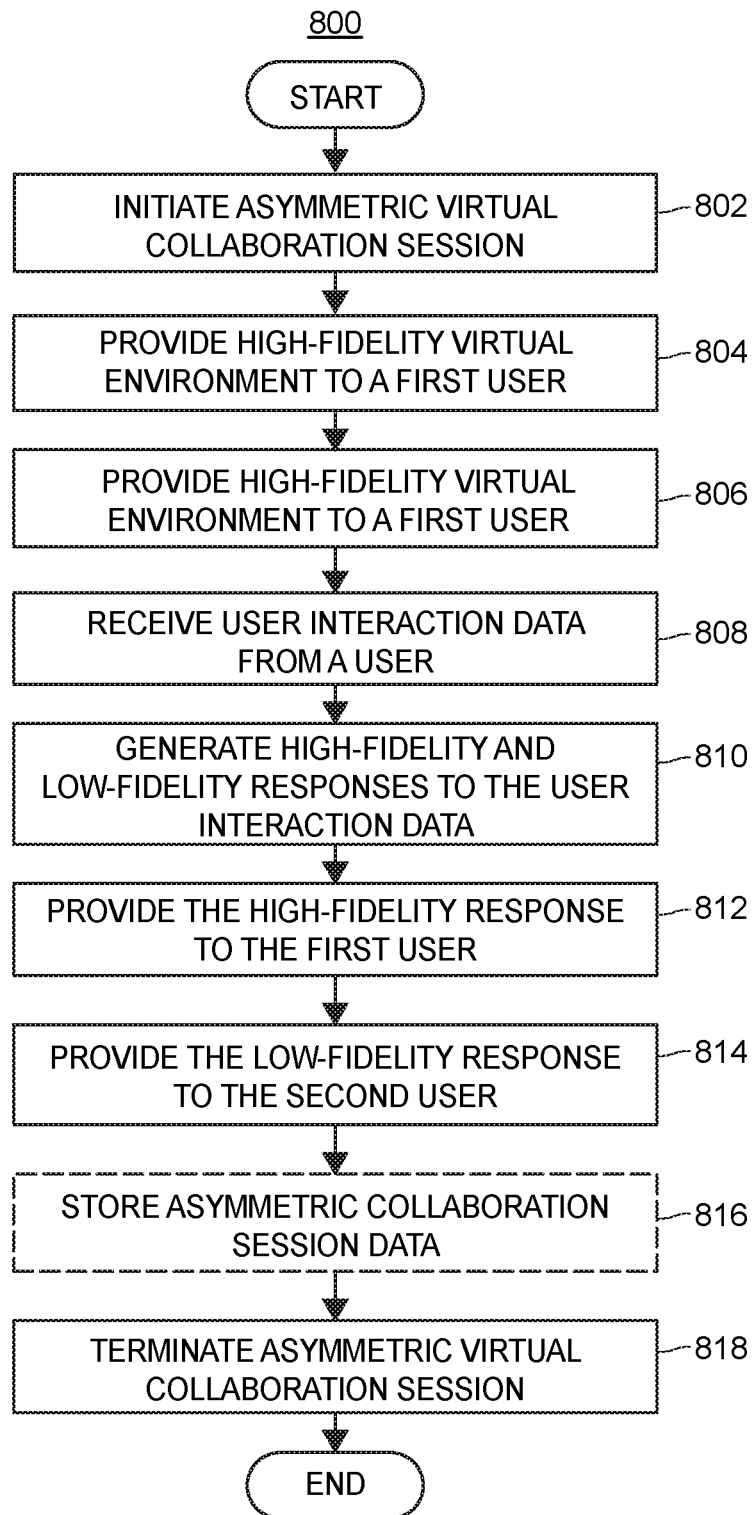
FIG. 8 illustrates an exemplary asymmetric virtual collaboration method for establishing and facilitating asymmetric virtual collaboration sessions between multiple users to provide the users with virtual representations of different quality.

FIG. 8 illustrates an exemplary asymmetric virtual collaboration method 800 for establishing and facilitating asymmetric virtual collaboration sessions between multiple users to provide the users with virtual representations of different quality. The asymmetric virtual collaboration method 800 may be implemented by a virtual collaboration application or software system executing on the server 140 of the collaborative virtual environment system 100, in a manner similar to that discussed above. To implement the asymmetric virtual collaboration method 800, the server 140 may receive data from and provide data to a plurality of virtual environment interface devices 200, such as a (low-capability) mobile computing device 110 and a (high-capability) virtual reality system 120. Although two users are described below for simplicity, it should be understood that any number of users may collaborate in an asymmetric virtual collaboration session.

To facilitate collaboration between users of high-capability devices and low-capability devices in an asymmetric virtual collaboration session, users of high-capability devices are provided with high-fidelity virtual environments, and users of low-capability devices are provided with low-fidelity virtual environments. The high-fidelity and low-fidelity virtual environments provided to users during an asymmetric virtual collaboration session are versions of the same environment, with the high-fidelity virtual environments being distinguished from the low-fidelity virtual environments by their level of detail. The low-fidelity virtual environments include less data than the high-fidelity virtual environments, thereby reducing data transmission and processing requirements for low-capability devices. Each of the high-fidelity virtual environments and the low-fidelity virtual environments discussed herein may be a virtual environment representing a physical site in a virtual space and may include a virtual representation of a physical building, such as the virtual environment 400 including a representation of building 402 discussed above. The asymmetric virtual collaboration method 800 described below is exemplary, and additional or alternative features may be included in some embodiments.

The method 800 may begin with initiating the asymmetric virtual collaboration session between at least a first user of a high-capability system and a second user of a low-capability system (block 802). A virtual collaboration application or software system may then provide a high-fidelity version of a virtual environment representing a physical location to the first user (block 804) and provide a low-fidelity version of the virtual environment representing the physical location to the second user (block 806). Upon receiving user interaction data from the first user or the second user (block 808), the virtual collaboration application or software system may generate a high-fidelity response and a low-fidelity response to the user interaction data (block 810). The high- and low-fidelity virtual environments may be synchronized between the first and second users by providing the high-fidelity response to the first user (block 812) and providing the low-fidelity response to the second user (block 814) in order to facilitate collaboration between the users. In some embodiments, collaboration session data may be stored for later use (block 816), and the asymmetric collaboration session may terminate (block 818).

At block 802, a virtual collaboration application or software system of the server 140 may initiate an asymmetric virtual collaboration session between a first user of a high-capability device and a second user of a low-capability device. Both the high-capability device and the low-capability device may be virtual environment interface devices 200. In some embodiments, the high-capability device may be a virtual reality system 120, and the low-capability device may be a mobile computing device 110 such as a mobile phone. Initiating the asymmetric virtual collaboration session may include establishing a first communication connection between the server 140 and the high-capability device of the first user (e.g., an expert trainer) via the network 130 and establishing a second communication connection between the server 140 and the low-capability device of the second user (e.g., a trainee) via the network 130. Additionally, initiating the asymmetric virtual collaboration session may include establishing a communication channel between the high-capability device of the first user and the low-capability device of the second user. Such communication connections and communication channel may be established as discussed above. In further embodiments, the second communication connection with the low-capability device may be a low-speed communication connection having insufficient data throughput for communicating data to present a high-fidelity version of the virtual environment to the second user.

At block 804, the virtual collaboration application or software system of the server 140 may provide a high-fidelity virtual environment to the high-capability device of the first user via the network 130. The high-fidelity virtual environment may include a representation of a physical location including a building for collaborative review. In some embodiments, the high-fidelity virtual environment may include one or more data tools for interaction with the virtual environment, such as the annotation tools, comment tools, viewing tools, information tools, or data capture tools discussed herein.

At block 806, the virtual collaboration application or software system of the server 140 may provide a low-fidelity virtual environment to the low-capability device of the second user via the network 130. In some embodiments, the server 140 may first generate the low-fidelity virtual environment from the high-fidelity virtual environment or from captured data used in generating the high-fidelity virtual environment. The low-fidelity virtual environment corresponds to the high-fidelity virtual environment to enable virtual collaboration between the first and second users during the asymmetric virtual collaboration session, but the low-fidelity virtual environment may be limited in the detail or data provided. In some embodiments, the low-fidelity virtual environment may represent the corresponding physical site with lower image resolution than the high-fidelity virtual environment. In further embodiments, the low-fidelity virtual environment may present a more limited field of view than the high-fidelity virtual environment, thereby representing a smaller region of the physical environment at any time. Such limited field of view enables the second user to view high-quality representations within the low-fidelity virtual environment, but limits the ability of the second user to assess the broader layout of the physical site. For example, the second user may only be presented with a portion of a building in such a field-limited low-fidelity virtual environment. Because of such limitations, some embodiments of the low-fidelity virtual environment may combine lower image resolution and limited field of view to provide higher image resolution in a limited central field of view (or providing the second user an option to obtain a higher image resolution for a limited field of view), with lower image resolution being provided elsewhere in the low-fidelity virtual environment.

At block 808, the server 140 may receive user interaction data from the high-capability device or the low-capability device via the network 130. The user interaction data may include data relating to the interaction of either the first user with the high-fidelity virtual environment or the second user with the low-fidelity virtual environment. As discussed above, the user interaction data may include location-specific user interaction data or location-independent user interaction data, and the user interaction data may include use of any of the data tools discussed herein, such as the annotation tools, comment tools, view tools, information tools, or data capture tools. For example, location-specific user interaction data may be used for annotating, commenting, or viewing perspective synchronization between the first and second users. Thus, the user interaction data may include an indication of a portion of the user's respective virtual environment (such as a portion of a building within the high- or low-fidelity virtual environment) or an indication of a viewing perspective of a user within the user's respective virtual environment (such as a location and viewing direction relative to a building).

In some embodiments, the environments of the first and second users may be configured to enable the users to generate different types of user interaction data. For example, the user interaction data may include an instruction from the first user to synchronize the views of the users by causing the second user's viewing perspective in the low-fidelity virtual environment to match the viewing perspective of the first user in the high-fidelity virtual environment, which instruction may include an indication of the first user's viewing perspective. As another example, the user interaction data may include use of a data capture tool (e.g., a virtual camera) to capture an electronic image of the first user's viewing perspective within the high-fidelity virtual environment, which may then be reviewed with the second user. As yet another example, the low-capability device configured to receive voice commands from the second user to address the lack of specific input devices, in which case the user interaction data received from the low-capability device may include or be derived from voice commands from the second user. For example, such voice commands may be related to any of the following: movement within the low-fidelity virtual environment, capturing a fixed-view two-dimensional image of a viewing perspective within the low-fidelity virtual environment, recording a voice note, or synchronizing a viewing perspective of the first and second users.

At block 810, the virtual collaboration application or software system of the server 140 may generate both a high-fidelity response to the user interaction data and a low-fidelity response to the user interaction data. In some instances, the high-fidelity and low-fidelity responses may be versions of the same response, such as high-fidelity and low-fidelity virtual overlays visually representing annotations or comments. In such instances, the low-fidelity response may simply be a corresponding but distinct version of the high-fidelity response, such as a modified version of the high-fidelity virtual response having lower image resolution. In other instances, the high-fidelity and low-fidelity responses may be distinct in type. For example, in response to the user interaction data causing the views of the users to be synchronized, a low-fidelity response may be generated that changes the second user's viewing perspective to match that of the first user, and a high-fidelity response may be generated that includes an indicator of view synchronization to be presented to the first user. As another example, the low-fidelity response may include a still image from the high-fidelity virtual environment, such as a high-fidelity fixed-view two-dimensional image of the viewing perspective of the first user in the high-fidelity virtual environment. In order to facilitate fuller collaboration, such still image may include annotations, comments, or other overlays as viewed by the first user in the high-fidelity virtual environment.

At block 812, the virtual collaboration application or software system of the server 140 may provide the high-fidelity response to the high-capability device of the first user via the network 130. Providing the high-fidelity response may include providing a high-fidelity data overlay, instructions to present a viewing perspective or a visual indicator to the first user, an update to the high-fidelity virtual environment, or other data causing the high-capability device to implement the high-fidelity response. For example, a high-fidelity virtual overlay may be sent to the high-capability device for display to the first user within the high-fidelity virtual environment. As another example, instructions regarding a viewing perspective may be sent to the high-capability device to cause the viewing perspective of the first user within the high-fidelity virtual environment to be adjusted, such as for synchronization with a view of the second user.

At block 814, the virtual collaboration application or software system of the server 140 may provide the low-fidelity response to the low-capability device of the second user via the network 130. Providing the low-fidelity response may include providing a low-fidelity data overlay, instructions to present a viewing perspective or a captured image to the second user, an update to the low-fidelity virtual environment, or other data causing the low-capability device to implement the low-fidelity response. For example, a low-fidelity virtual overlay corresponding to a high-fidelity overlay in the high-fidelity virtual environment may be sent to the low-capability device for display to the second user within the low-fidelity virtual environment. As another example, instructions regarding a viewing perspective may be sent to the low-capability device to cause the viewing perspective of the second user within the low-fidelity virtual environment to be adjusted, such as to match the viewing perspective of the first user within the high-fidelity virtual environment for synchronization of views between the first and second users.

At block 816, the server 140 may store collaboration session data from the asymmetric collaboration session in a database 146 or other memory for later reference or use. Such collaboration session data may include captured data, user interaction data, or data overlays. The collaboration session data may be based upon either or both of the high-fidelity virtual environment or the low-fidelity virtual environment. In some embodiments, a recording of the complete asymmetric virtual collaboration session may be stored for future review by the same or other users. The stored collaboration session data may be processed to reduce storage requirements prior to storage, such as by flattening the 3-D virtual space into a 2-D image or video, which may further facilitate transmission and review of the captured data.

At block 818, the server 140 may terminate the asymmetric virtual collaboration session. Terminating the virtual collaboration session may include disconnecting the user communication connections and closing the communication channel between the users.

Asynchronous Virtual Collaboration Sessions

As discussed above, part or all of various virtual collaboration sessions may be captured and stored for later use. Such later use may include review by the same or different users. For example, a portion of a virtual collaboration session between an expert trainer and a trainee may be particularly instructive for other trainees. By capturing such collaboration session data, such other trainees may access the stored data for instruction in an asynchronous manner. Similarly, the expert trainer or the trainee involved in the virtual collaboration session may later access the stored virtual collaboration session data for reference or evaluation purposes. Such later users of the stored virtual collaboration session data may further annotate or comment on the stored data, which additional annotation or comment data may also be stored for later use.

Figure 9:
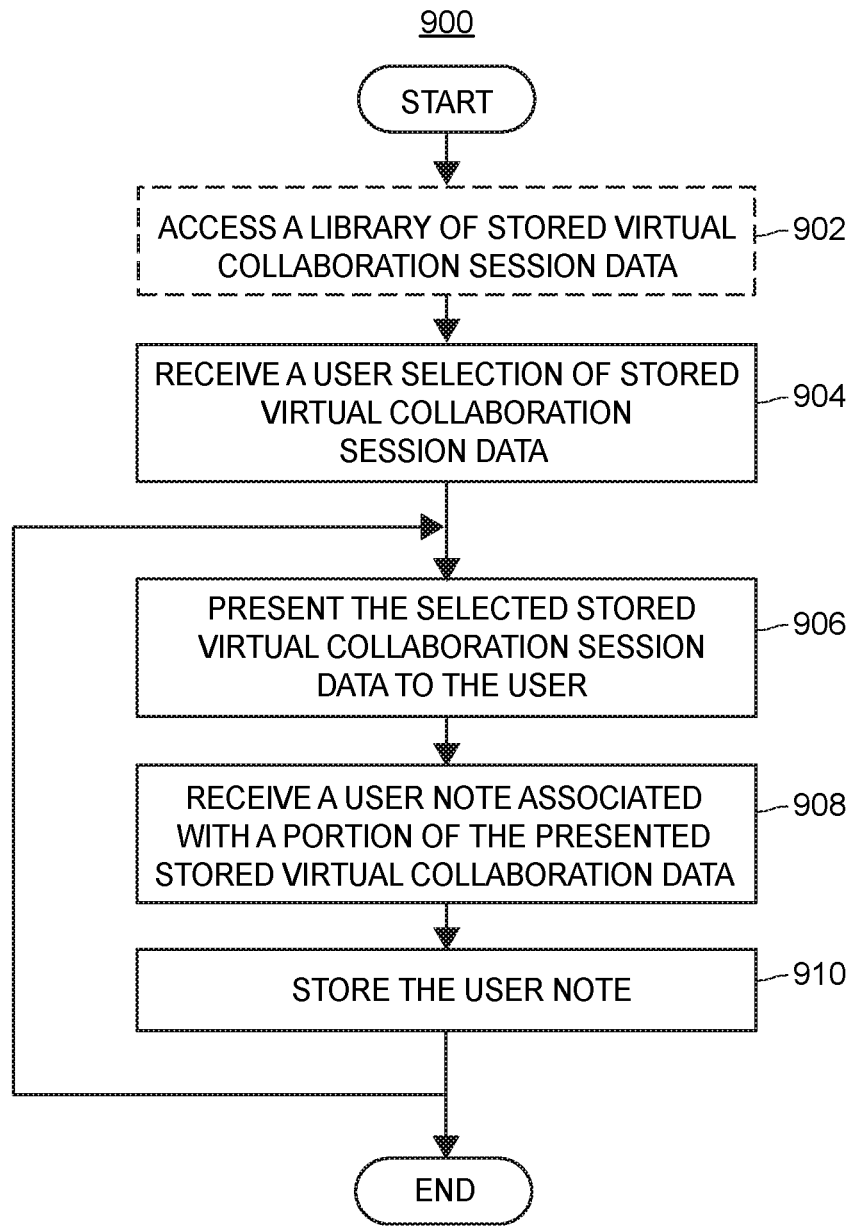
FIG. 9 illustrates an exemplary asynchronous virtual collaboration session review method for reviewing stored virtual collaboration session data from a previous virtual collaboration session.

FIG. 9 illustrates an exemplary asynchronous virtual collaboration session review method 900 for reviewing stored virtual collaboration session data from a previous virtual collaboration session. The method 900 may be implemented by an application executing on the server 140 of the collaborative virtual environment system 100 or a similar server of a similar system to provide the stored virtual collaboration session data to a user of a user computing device, such as a mobile computing device 110, virtual reality system 120, or other computing device connected to the server 140 via the network 130. Although one user is described below for simplicity, it should be understood that any number of users may collaborate in reviewing the stored virtual collaboration session data in a virtual collaboration session, in a manner similar to the virtual collaboration session methods described above.

The asynchronous virtual collaboration session review method 900 may begin, in some embodiments, with a user computing device accessing a library of stored virtual collaboration session data (block 902). Upon a user selecting a stored collaboration session by the user computing device (block 904), stored virtual collaboration session data associated with the selected virtual collaboration session may be presented to the user via the user computing device (block 906). A user note associated with a portion of the stored virtual collaboration session data may be received from the user computing device (block 908) and stored for further use (block 910). When no further virtual collaboration session data remains for presentation to the user, the method 900 may end.

At block 902, in some embodiments, a user may access a library of stored virtual collaboration session data associated with one or more virtual collaboration sessions. To access the library, the user may interact with the user computing device to communicate with the server 140 via the network 130. In some embodiments, the virtual collaboration sessions available to the user may be limited by the user's identity, such as by access rights restrictions associated with user identification credentials (i.e., user IDs). The user may be a user who participated in a stored virtual collaboration session, or the user may be separate from the users who participated in the stored virtual collaboration sessions. For example, an expert trainer may access a stored virtual collaboration session to evaluate the performance of one or more trainee users. Alternatively, a separate reviewer may access the stored virtual collaboration session to perform such evaluation. As another example, additional trainees may access the stored virtual collaboration session for training purposes.

At block 904, the user may select one of the stored virtual collaboration sessions for review. For example, the user may select such virtual collaboration session from a list of stored virtual collaboration sessions. In some embodiments, selecting the stored virtual collaboration session may include following an electronic link or other resource locator indicating an electronic location or file associated with the stored virtual collaboration session (e.g., clicking a link in an e-mail message). In further embodiments, the user may select a portion of the virtual collaboration session for review, which may include a limited set of the stored data. In yet further embodiments, selection of a portion of the virtual collaboration session may include selecting a perspective or view from which to view the stored virtual collaboration session data. For example, the user may select to view the virtual collaboration session from the perspective of a trainer or trainee, depending upon the user's purpose for reviewing the virtual collaboration session.

At block 906, the server 140 may provide stored virtual collaboration session data associated with the selected virtual collaboration session to the user computing device via the network 130 for presentation to the user. In some embodiments, the stored virtual collaboration session data may store only a limited representation of the virtual environment, as discussed elsewhere herein. The user computing device may then present the received virtual collaboration session data to the user via a display for review by the user. The user computing device may also present one or more review options or data tools to the user, such as the data tools discussed elsewhere herein. Various data review, navigation, or navigation options or control may likewise be presented to the user via the user computing device to facilitate review.

At block 908, the user computing device may receive a user note associated with a portion of the stored virtual collaboration session data from the user, which user note may then be sent from the user computing device to the server 140 via the network 130. The user note may include an annotation or comment associated with a time during the virtual collaboration session or a location within the virtual environment represented in the stored virtual collaboration session data. For example, the user may add a note of an aspect of a building feature not recognized or discussed during the virtual collaboration session. Such note may be a text note, an recorded audio clip, or a visual mark-up of the stored virtual collaboration session data. In some embodiments, the user note may include an evaluation of the actions of one or more of the users during the virtual collaboration session, such as the actions of a trainee relating to assessment of a part of a building within the virtual environment recorded in the stored virtual collaboration session data. Such evaluations may be used for further training of the evaluated users.

At block 901, the server 140 may store the user note in a database 146 or other memory device. The user note may be associated with the user and may be made available to other users. In some embodiments, the user note may be stored separately from the virtual collaboration session data in order to maintain the integrity of the original recording of the virtual collaboration session. Storing the user note separately from the virtual collaboration session data may also enable other users to selectively enable or disable presentation of the user note.

The asynchronous virtual collaboration session review method 900 may continue until the user has reviewed all the stored virtual collaboration session data selected by the user or until the user has finished adding any user notes relating to such stored virtual collaboration session data. The asynchronous virtual collaboration session review method 900 may then terminate.

Additional Considerations

Although the following text sets forth a detailed description of numerous different embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (code embodied on a non-transitory, tangible machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the terms "coupled," "connected," "communicatively connected," or "communicatively coupled," along with their derivatives. These terms may refer to a direct physical connection or to an indirect (physical or communication) connection. For example, some embodiments may be described using the term "coupled" to indicate that two or more elements are in direct physical or electrical contact. The term "coupled," however, may also mean that two or more elements are not in direct contact with each other, but yet still co-operate or interact with each other. Unless expressly stated or required by the context of their use, the embodiments are not limited to direct connection.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless the context clearly indicates otherwise.

This detailed description is to be construed as exemplary only and does not describe every possible embodiment, as describing every possible embodiment would be impractical, if not impossible. One could implement numerous alternate embodiments, using either current technology or technology developed after the filing date of this application.

Upon reading this disclosure, those of skill in the art will appreciate still additional alternative structural and functional designs for system and a method for assigning mobile device data to a vehicle through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The particular features, structures, or characteristics of any specific embodiment may be combined in any suitable manner and in any suitable combination with one or more other embodiments, including the use of selected features without corresponding use of other features. In addition, many modifications may be made to adapt a particular application, situation or material to the essential scope and spirit of the present invention. It is to be understood that other variations and modifications of the embodiments of the present invention described and illustrated herein are possible in light of the teachings herein and are to be considered part of the spirit and scope of the present invention.

Finally, the patent claims at the end of this patent application are not intended to be construed under 35 U.S.C. § 112(f), unless traditional means-plus-function language is expressly recited, such as "means for" or "step for" language being explicitly recited in the claims. The systems and methods described herein are directed to an improvement to computer functionality, and improve the functioning of conventional computers.

What is claimed is:

1. A computer-implemented method for recording virtual collaboration between a plurality of users during a virtual collaboration session, comprising:

establishing, via a communication network, a first communication connection with a first virtual environment interface device associated with a first user of the plurality of users;

establishing, via the communication network, a second communication connection with a second virtual environment interface device associated with a second user of the plurality of users;

establishing, by one or more processors, a communication channel between the first user and the second user via the first and second communication connections for facilitating bidirectional communication by routing real-time communication data between the first user and the second user during the virtual collaboration session;

providing, by the one or more processors, a virtual environment representing a physical location including a building to the first and second virtual environment interface devices for presentation to the first and second users;

causing, by the one or more processors, one or more data capture tools to be presented to at least the second user within the virtual environment, wherein the one or more data capture tools include a virtual video recording tool configured to capture recordings within the virtual environment;

receiving, by the one or more processors and at a first time, a first data capture command from the second user, wherein the first data capture command is executable by the virtual video recording tool;

causing, by the one or more processors and based on the first data capture command, the virtual video recording tool to capture a recording, within the virtual environment, from a viewing perspective of the second user within the virtual environment;

determining, by the one or more processors and based on the recording, an environmental state of the virtual environment relative to the second user at the first time, wherein the environmental state indicates the viewing perspective of the second user;

generating, by the one or more processors, a limited representation of the virtual environment based upon the recording and the environmental state, wherein the limited representation includes:
an annotation providing an assessment of the building, and
a virtual video illustrating:
the viewing perspective of the second user, and
an avatar representing movements of the second user within the virtual environment, and associated with the building;

storing, in a computer memory, the limited representation of the virtual environment for later review; and causing, by the one or more processors, a recording of the limited representation of the virtual environment to be presented on a display of a computing device associated with a third user; the recording including the avatar.

2. The computer-implemented method of claim 1, further comprising:
receiving, by the one or more processors, a second data capture command from the second user, wherein the second data capture command is executable by a virtual camera tool; and
the limited representation of the virtual environment includes a fixed-view two-dimensional image from the viewing perspective of the second user.

3. The computer-implemented method of claim 2, wherein:
the environmental state of the virtual environment indicates a viewing window centered on a gaze location of the second user; and
the fixed-view two-dimensional image captures the viewing window.

4. The computer-implemented method of claim 1, wherein:
the environmental state of the virtual environment indicates the movements of the second user within the virtual environment; and
the limited representation includes the virtual video illustrating the movements of the second user over a time period during the virtual collaboration session.

5. The computer-implemented method of claim 4, wherein:
the movements of the second user include repositioning within the virtual environment and hand movements of the second user within the virtual environment.

6. The computer-implemented method of claim 1, further comprising:
receiving, by the one or more processors, a second data capture command from the second user, wherein the second data capture command is executable by a user annotation tool configured to capture a representation of a region of the virtual environment and the annotation associated with the region of the virtual environment;
the environmental state of the virtual environment indicates a position of the second user within the virtual environment; and
the limited representation of the virtual environment includes the representation of the region of the virtual environment and the annotation.

7. The computer-implemented method of claim 6, wherein the annotation includes a representation of a measurement of a physical distance at the physical location generated from a virtual distance between locations within the virtual environment.

8. The computer-implemented method of claim 1, further comprising:
accessing, by a processor of the computing device via the communication network, a recording of the virtual collaboration session, wherein the recording of the virtual collaboration session includes a plurality of limited representations of the virtual environment, including the limited representation of the virtual environment.

9. The computer-implemented method of claim 8, further comprising:
receiving, by the processor, a user note associated with a portion of the limited representation of the virtual environment from the third user; and
storing, in the computer memory, a record of the user note indicating the portion of the limited representation of the virtual environment, wherein the record of the user note is stored separately from the limited representation of the recording of the virtual collaboration session.

10. The computer-implemented method of claim 9, wherein the user note includes an evaluation of actions of the second user during the virtual collaboration session relating to assessment of the building based at least in part upon the first data capture command from the second user.

11. A computer system for recording virtual collaboration between a plurality of users during a virtual collaboration session, comprising:
one or more processors;
a communication module communicatively connected to the one or more processors and configured to communicate with computing devices via a communication network;
a non-transitory program memory communicatively coupled to the one or more processors and storing executable instructions that, when executed by the one or more processors, cause the computer system to:
establish a first communication connection via the communication module with a first virtual environment interface device associated with a first user of the plurality of users;
establish a second communication connection via the communication module with a second virtual environment interface device associated with a second user of the plurality of users;

establish a communication channel between the first user and the second user via the first and second communication connections for facilitating bidirectional communication by routing real-time communication data between the first user and the second user during the virtual collaboration session;

provide a virtual environment representing a physical location including a building to the first and second virtual environment interface devices for presentation to the first and second users;

cause one or more data capture tools to be presented to at least the second user within the virtual environment, wherein the one or more data capture tools include a virtual video recording tool configured to capture recordings within the virtual environment;

receive, at a first time, a first data capture command from the second user, wherein the first data capture command is executable by the virtual video recording tool;

cause, based on the first data capture command, the virtual video recording tool to capture a recording, within the virtual environment, from a viewing perspective of the second user within the virtual environment;

determine, based on the recording, an environmental state of the virtual environment relative to the second user at the first time, wherein the environmental state indicates the viewing perspective of the second user;

generate a limited representation of the virtual environment based upon the recording and the environmental state, wherein the limited representation includes:
　an annotation providing an assessment of the building, and
　a virtual video illustrating:
　　the viewing perspective of the second user, and
　　an avatar representing movements of the second user within the virtual environment, and associated with the building;

store the limited representation of the virtual environment for later review in the non-transitory program memory; and cause a recording of the limited representation of the virtual environment to be presented on a display of a computing device associated with a third user; the recording including the avatar.

12. The computer system of claim 11, further comprising:
receive a second data capture command from the second user, wherein the second data capture command is executable by a virtual camera tool; and
the limited representation of the virtual environment includes a fixed-view two-dimensional image from the viewing perspective of the second user.

13. The computer system of claim 11, wherein:
receive a second data capture command from the second user, wherein the second data capture command is associated with the virtual video recording tool and a viewing perspective of the first user;
cause, based on the second data capture command, the virtual video recording tool to capture a second recording, within the virtual environment, from the viewing perspective of the first user within the virtual environment;

determine the environmental state of the virtual environment indicates movements of the first user within the virtual environment; and
generate a second limited representation of the virtual environment includes the second recording of the movements of the first user over a time period during the virtual collaboration session.

14. The computer system of claim 11, further comprising:
receive a second data capture command from the second user, wherein the second data capture command is executable by a user annotation tool configured to capture a representation of a region of the virtual environment and the annotation associated with the region of the virtual environment;
the environmental state of the virtual environment indicates a position of the second user within the virtual environment; and
the limited representation of the virtual environment includes the representation of the region of the virtual environment and the annotation.

15. The computer system of claim 11, wherein the executable instructions further cause the computer system to:
receive a request for a recording of the virtual collaboration session from the computing device associated with the third user via the communication module, wherein the recording of the virtual collaboration session includes a plurality of limited representations of the virtual environment, including the limited representation of the virtual environment and the avatar representing movements of the second user providing the evaluation of the building;
access the limited representation of the virtual environment; and
send the limited representation of the virtual environment to the computing device via the communication module for presentation to the third user.

16. A tangible, non-transitory computer-readable medium storing executable instructions for recording virtual collaboration between a plurality of users during a virtual collaboration session that, when executed by at least one processor of a computer system, cause the computer system to:
establish a first communication connection with a first virtual environment interface device associated with a first user of the plurality of users via a communication network;
establish a second communication connection with a second virtual environment interface device associated with a second user of the plurality of users via the communication network;
establish a communication channel between the first user and the second user via the first and second communication connections for facilitating bidirectional communication by routing real-time communication data between the first user and the second user during the virtual collaboration session;
provide a virtual environment representing a physical location including a building to the first and second virtual environment interface devices for presentation to the first and second users;
cause one or more data capture tools to be presented to at least the second user within the virtual environment, wherein the one or more data capture tools include a virtual video recording tool configured to capture recordings within the virtual environment;
receive, at a first time, a first data capture command from the second user, wherein the first data capture command is executable by the virtual video recording tool;

cause, based on the first data capture command, the virtual video recording tool to capture a recording, within the virtual environment, from a viewing perspective of the second user within the virtual environment;

determine, based on the recording, an environmental state of the virtual environment relative to the second user at the first time, wherein the environmental state indicates the viewing perspective of the second user;

generate a limited representation of the virtual environment based upon the recording and the environmental state, wherein the limited representation includes:
 an annotation providing an assessment of the building, and
 a virtual video illustrating:
  the viewing perspective of the second user, and
  an avatar representing movements of the second user providing an evaluation of the building within the virtual environment;

store the limited representation of the virtual environment for later review in a computer memory; and cause a recording of the limited representation of the virtual environment to be presented on a display of a computing device associated with a third user; the recording including the avatar.

17. The tangible, non-transitory computer-readable medium of claim 16, further comprising:
receive a second data capture command from the second user, wherein the second data capture command is executable by a virtual camera tool; and
the limited representation of the virtual environment includes a fixed-view two-dimensional image from the viewing perspective of the second user.

18. The tangible, non-transitory computer-readable medium of claim 16, wherein:
receive a second data capture command from the second user, wherein the second data capture command is associated with the virtual video recording tool and a viewing perspective of the first user;
cause, based on the second data capture command, the virtual video recording tool to capture a second recording, within the virtual environment, from the viewing perspective of the first user within the virtual environment;
determine the environmental state of the virtual environment indicates movements and viewing perspectives of the first user within the virtual environment; and
generate a second limited representation of the virtual environment includes the second recording of the movements and the viewing perspectives of the first user over a time period during the virtual collaboration session.

19. The tangible, non-transitory computer-readable medium of claim 16, further comprising:
receive a second data capture command from the second user, wherein the second data capture command is executable by a user annotation tool configured to capture a representation of a region of the virtual environment and the annotation associated with the region of the virtual environment; and
the environmental state of the virtual environment indicates a position of the second user within the virtual environment.

20. The tangible, non-transitory computer-readable medium of claim 16, further storing executable instructions that further cause the computer system to:
receive a request for a recording of the virtual collaboration session from the computing device associated with the third user via the communication network, wherein the recording of the virtual collaboration session includes a plurality of limited representations of the virtual environment, including the limited representation of the virtual environment and the avatar providing the evaluation of the building;
access the limited representation of the virtual environment; and
send the limited representation of the virtual environment to the computing device via the communication network for presentation to the third user.

* * * * *